United States Patent
Schulze

(10) Patent No.: US 9,813,721 B2
(45) Date of Patent: Nov. 7, 2017

(54) LAYER-BASED VIDEO ENCODING

(71) Applicant: GetGo, Inc., Boston, MA (US)

(72) Inventor: Steffen Schulze, Dresden (DE)

(73) Assignee: GetGo, Inc., Boston, MA (US)

( * ) Notice: Subject to any disclaimer, the term of this patent is extended or adjusted under 35 U.S.C. 154(b) by 110 days.

(21) Appl. No.: 14/548,642

(22) Filed: Nov. 20, 2014

(65) Prior Publication Data

US 2016/0150235 A1    May 26, 2016

(51) Int. Cl.
| | |
|---|---|
| *H04N 7/12* | (2006.01) |
| *H04N 19/30* | (2014.01) |
| *H04N 19/132* | (2014.01) |
| *H04N 19/44* | (2014.01) |
| *H04N 19/50* | (2014.01) |
| *H04N 19/513* | (2014.01) |
| *H04N 19/119* | (2014.01) |
| *H04N 19/61* | (2014.01) |
| *H04N 19/463* | (2014.01) |
| *H04N 19/157* | (2014.01) |
| *H04N 19/187* | (2014.01) |
| *H04N 19/625* | (2014.01) |
| *H04N 19/29* | (2014.01) |

(52) U.S. Cl.
CPC ........... *H04N 19/30* (2014.11); *H04N 19/119* (2014.11); *H04N 19/132* (2014.11); *H04N 19/157* (2014.11); *H04N 19/187* (2014.11); *H04N 19/44* (2014.11); *H04N 19/463* (2014.11); *H04N 19/50* (2014.11); *H04N 19/513* (2014.11); *H04N 19/61* (2014.11); *H04N 19/625* (2014.11); *H04N 19/29* (2014.11)

(58) Field of Classification Search
CPC ..................................................... H04N 19/30
See application file for complete search history.

(56) References Cited

U.S. PATENT DOCUMENTS

| | | |
|---|---|---|
| 5,020,113 A | 5/1991 | Lo et al. |
| 5,654,771 A | 8/1997 | Tekalp et al. |
| 6,348,918 B1 | 2/2002 | Szeliski et al. |

(Continued)

FOREIGN PATENT DOCUMENTS

| | | |
|---|---|---|
| EP | 0753970 A2 | 1/1997 |
| WO | 2012006299 A1 | 1/2012 |

OTHER PUBLICATIONS

"Analysis of MPEG-4 scalable encoded video", Mian, S.H., Internet Protocols, Technology and Publications (VoIP), IEE Proceedings: Communications, Institution of Electrical Engineers, GB, vol. 151, No. 3, Jun. 25, 2004, pp. 270-279.

(Continued)

*Primary Examiner* — Tracy Y Li
(74) *Attorney, Agent, or Firm* — BainwoodHuang

(57) ABSTRACT

A technique for encoding a video signal generates multiple layers and multiple corresponding masks for each of a set of blocks of the video signal. Each of the layers for a given block is a rendition of that block, and each of the masks distinguishes pixels of the respective layer that are relevant in reconstructing the block from pixels that are not. The encoder applies lossy compression to each of the layers and transmits the lossily compressed layers and a set of the masks to a decoder, such that the decoder may reconstruct the respective block from the layers and the mask(s).

19 Claims, 10 Drawing Sheets

(56) References Cited

U.S. PATENT DOCUMENTS

| | | | |
|---|---|---|---|
| 6,571,017 B1 | 5/2003 | Boon | |
| 8,326,051 B1 * | 12/2012 | Hobbs | H04N 1/4092 382/232 |
| 2003/0202697 A1 | 10/2003 | Simard et al. | |
| 2008/0050023 A1 * | 2/2008 | Feng | H04N 1/41 382/232 |
| 2008/0267293 A1 * | 10/2008 | Swami | H04N 19/159 375/240.16 |
| 2014/0185664 A1 * | 7/2014 | Van Der Auwera | H04N 19/50 375/240.02 |
| 2015/0016517 A1 * | 1/2015 | Mori | H04N 19/597 375/240.12 |
| 2015/0078456 A1 | 3/2015 | Hannuksela | |

OTHER PUBLICATIONS

"MPEG-r Visual Texture Coding: More Than Just Compression", Iole Moccagatta and Homer Chen, ICCE International Conference on Los Angeles, CA, USA Jun. 22-24, 1999, Piscataway, NJ pp. 302-303.

International Search Report for PCT/US2015/061533 (Apr. 2016).

"Semi-automatic Motion Segmentation with Motion Layer Mosaics", (Lecture notes in computer science), Fradet et al., Computer Vision—ECCV 2008, Thomson Corporate Research, Rennes, France and INRIA, Rennes-Bretagne Atlantique, France, Oct. 12, 2008, pp. 210-223.

"Segmented Coding of Digital Image Sequences", IEE Proceedings I, Soryani, M. et al., Institution of Electrical Engineers, Stevenage, GB, Apr. 1, 1992, vol. 139, No. 2, Part 01, pp. 212-218, section "5.1 Intraframe segmented coding of colour pictures".

International Search Report for PCT/US2015/061534 (Feb. 2016).

* cited by examiner

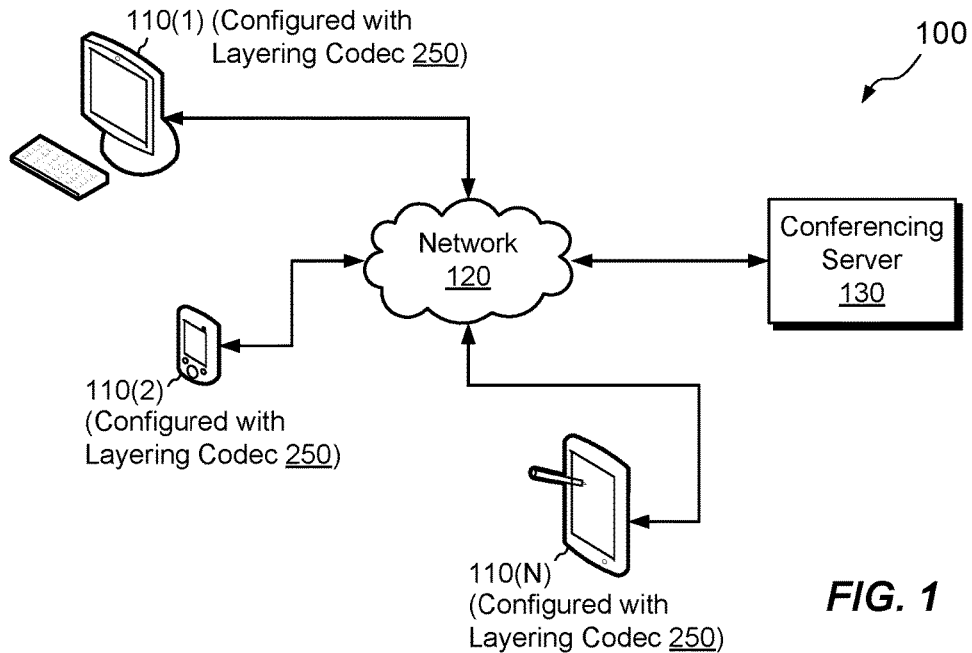
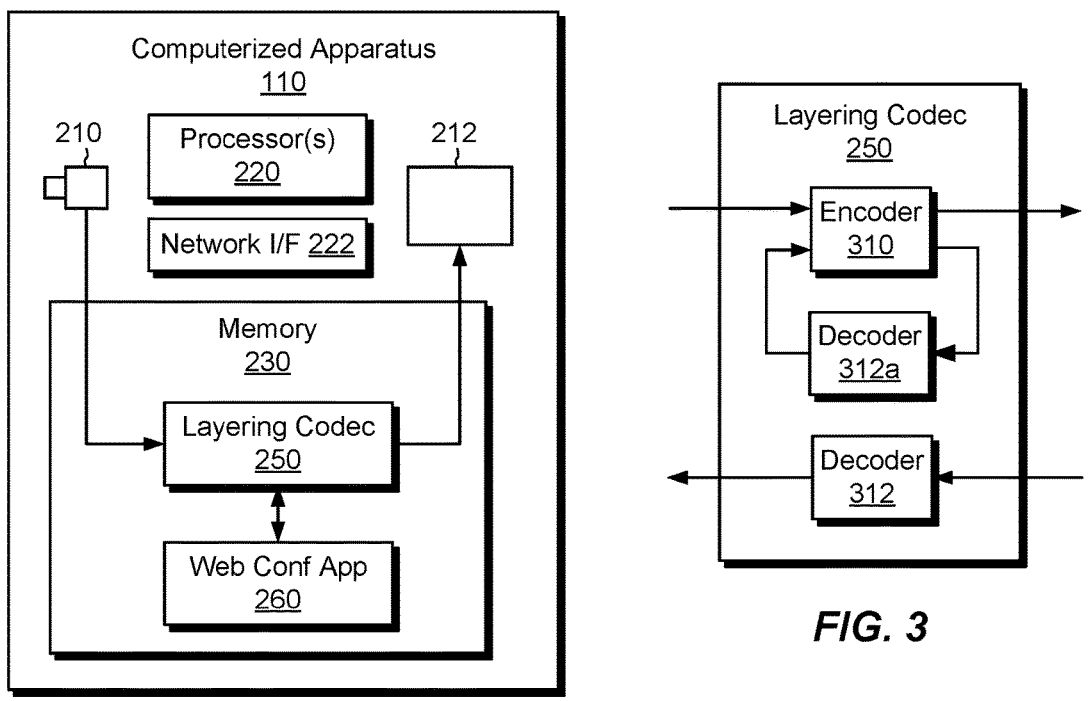
FIG. 1
FIG. 2
FIG. 3

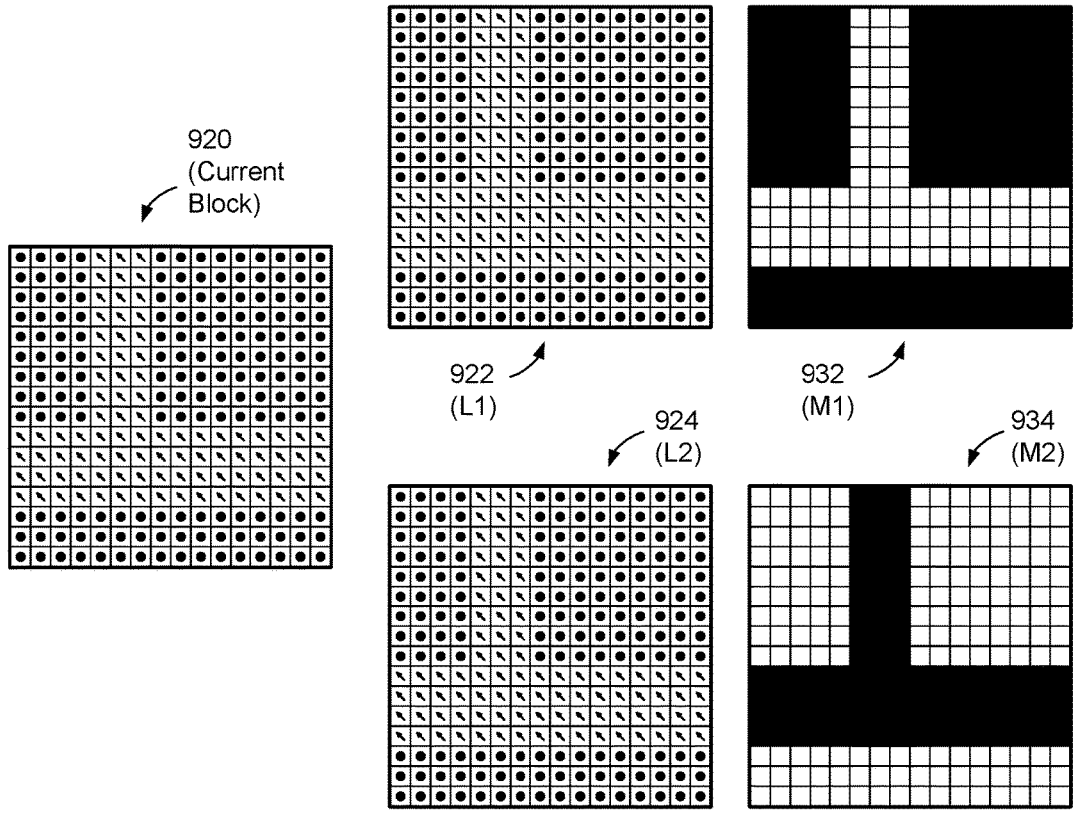

920 (Current Block)
922 (L1)
924 (L2)
932 (M1)
934 (M2)

FIG. 9A

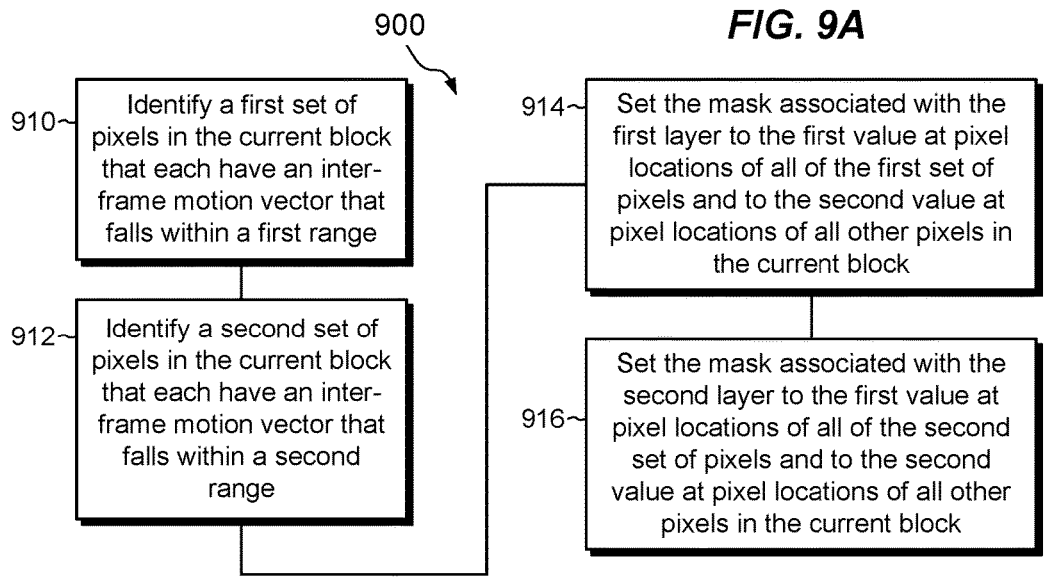

900

910 — Identify a first set of pixels in the current block that each have an inter-frame motion vector that falls within a first range 912 — Identify a second set of pixels in the current block that each have an inter-frame motion vector that falls within a second range 914 — Set the mask associated with the first layer to the first value at pixel locations of all of the first set of pixels and to the second value at pixel locations of all other pixels in the current block 916 — Set the mask associated with the second layer to the first value at pixel locations of all of the second set of pixels and to the second value at pixel locations of all other pixels in the current block

FIG. 9B

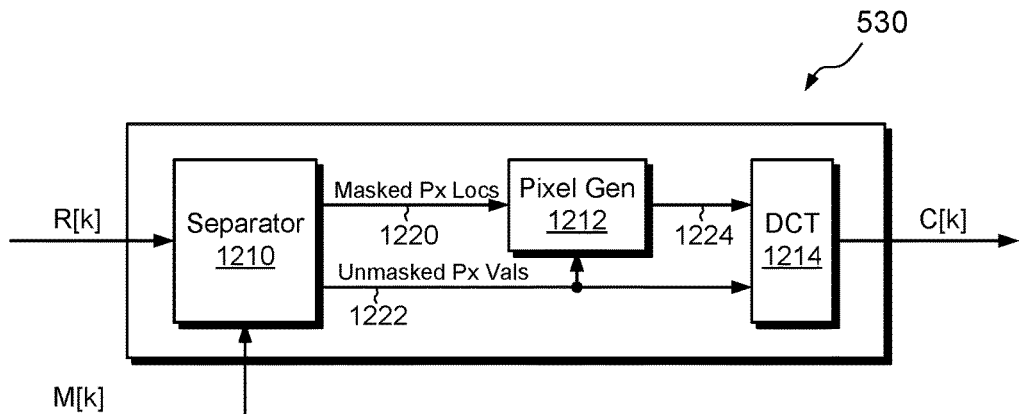
FIG. 12A
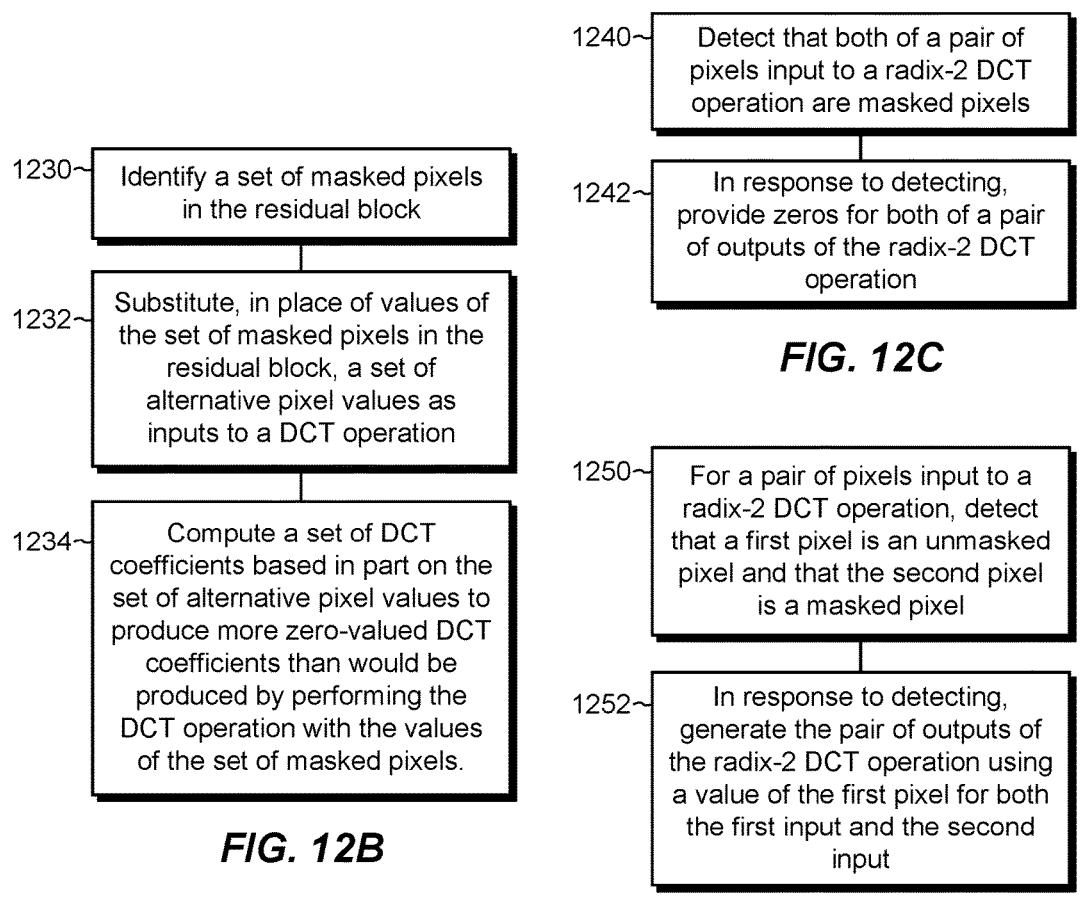
FIG. 12B
FIG. 12C
FIG. 12D

LAYER-BASED VIDEO ENCODING

BACKGROUND

A conventional video codec (compressor/decompressor) includes both an encoder and a decoder. The encoder compresses video signals, and the decoder decompresses video signals. Codecs typically perform compression and decompression on "blocks" of video "frames," where each block is a square array of pixels, such as 8×8 pixels or 16×16 pixels, for example, and each frame corresponds to a still snapshot of the video signal. Well-known video codecs include those conforming to H.264 or H.265 standards.

Codecs typically achieve efficient compression by taking advantage of predictions. For example, an encoder may employ intra-frame predictions, which apply information from previously-processed blocks in the same frame as a current block to predict pixels in the current block. An encoder may also employ inter-frame predictions, which apply information from previously-processed frames to predict pixels in the current block. For each current block to be encoded, the encoder selects a prediction mode and generates a prediction. The encoder then subtracts the prediction, pixel-by-pixel, from the current block to generate a residual block. If the current prediction closely matches the current block, then the residual block generally requires less data to encode than would be required for the current block itself. The encoder may next perform a lossless, 2-dimensional Discrete Cosine Transform, or "DCT," on the residual block. The DCT transforms pixel data in the spatial domain into coefficients in the frequency domain. The encoder then subjects the DCT coefficients to a lossy quantization process, whereby DCT coefficients are scaled and rounded and/or truncated, to reduce their granularity and to maximize the number of coefficients that equal zero. Zero-valued coefficients are highly compressible and are thus preferred where high compression ratios are desired. The encoder typically performs lossless entropy encoding on the quantized DCT coefficients and stores the results and/or transmits them to a decoder, e.g., at another location, along with an identifier of the prediction mode that the encoder used in compressing the current block.

The decoder performs essentially the reverse process. For example, the decoder, upon receiving a compressed block, reverses the entropy encoding, rescales the entropy-decoded results, and performs an inverse-DCT operation (IDCT) to reconstruct the residual block. The decoder also reads the prediction mode received from the encoder and replicates the same prediction locally, i.e., using previously decoded blocks. The decoder than adds the replicated prediction to the residual block to reconstruct the original block, albeit with losses introduced by encoder quantization. The decoder assembles the reconstructed original block along with other reconstructed blocks to generate frames of video data for viewing on a user device, such as a computer, television, smart phone, tablet, or the like.

SUMMARY

Residual blocks produced by conventional codecs can include detailed content, which encoders cannot always accurately predict. For example, consider the case where a video signal presents small text, such that the encoder produces residual blocks that include entire characters or portions of characters. When the encoder performs DCT operations on such residual blocks, the resulting frequency content can be high, reflecting detailed shapes and high-contrast edges of the characters. In situations such as this, the encoder is subjected to a tradeoff. If the encoder quantizes the DCT coefficients aggressively, so as to reduce the size and/or number of non-zero DCT coefficients, legibility of reconstructed text may suffer. However, if the encoder quantizes the DCT coefficients less aggressively, compression ratios may suffer, meaning that more data will need to be transmitted to ensure legible reconstruction.

One prior codec technology, which has been used in web conferencing applications, addresses this tradeoff for a limited set of circumstances using a hybrid approach. According to the hybrid approach, an encoder identifies synthetic content in video images, such as text in a document shared during a web conference, and compresses the synthetic content using a lossless format, such as PNG (Portable Network Graphics). The encoder distinguishes synthetic content from natural content by counting colors, with little or no color variation in a region suggesting that the content in that region is synthetic. The encoder compresses natural image content using lossy compression, such as JPEG (Joint Photographic Experts Group). Thus, a codec used in the hybrid approach produces two different compressed data streams, one that is lossless (PNG) and another that is lossy (JPEG). A decoder receiving these two data streams uses alpha blending to reconstitute received blocks.

Although the hybrid approach can help to preserve synthetic content, such as text, through the use of lossless compression, the use of lossless compression is limited to synthetic content, such that fine detail in natural parts of an image are not always preserved. Also, the hybrid approach can produce compression artifacts at boundaries between synthetic and natural content. For example, if synthetic text is displayed over a natural background, noisy pixels may appear in the natural background around the text, thus obscuring the text even though the text itself has been losslessly compressed. Further, because the hybrid approach compresses synthetic content using lossless compression, compression ratios are not as good as they might be if lossy compression could be used.

In contrast with the above-described prior approaches, an improved technique for encoding a video signal generates multiple layers and multiple corresponding masks for each of a set of blocks of the video signal. Each of the layers for a given block is a rendition of that block, and each of the masks distinguishes pixels of the respective layer that are relevant in reconstructing the block from pixels that are not. The encoder applies lossy compression to each of the layers and transmits the lossily compressed layers and a set of the masks to a decoder, such that the decoder may reconstruct the respective block from the layers and the mask(s).

Advantageously, the encoder can often generate layers for a block such that residual blocks for each layer are more amenable to compression than would be a residual block derived directly from the original block without layers. Thus, more aggressive compression can often be performed on a per-layer basis than could be performed on a per-block basis. In addition, image quality of reconstructed images is often improved, as edge artifacts introduced by prior compression schemes can be reduced or eliminated through application of masks.

In some examples, the encoder generates the masks as binary masks, with a different 1-bit value provided for each pixel location in the corresponding layer. In some examples, the encoder generates the masks to be mutually exclusive of one another, such that the encoder may transmit one fewer mask to the decoder than there are layers representing the current block. The decoder may then regenerate the missing mask from the other masks that are received for the current block. In some examples, the encoder compresses the mask (s) losslessly. However, as each mask can be implemented with only one bit per pixel, transmitting masks can often be done with little effect on overall compression ratios.

The improved technique may generate layers and associated masks in a wide variety of ways. In some examples, an encoder generates layers and associated masks using predictions (e.g., intra-frame and/or inter-frame predictions). For example, the encoder may test various prediction modes to determine which modes yield the best predictions for a current block. The encoder may then use the best predictions as the layers for the current block, and may assign mask values based on which predictions most closely match the pixels of the current block.

An encoder may also generate layers and associated masks to separate foreground content from background content, to separate groups of pixels of different colors, and/or by other means. In some examples, layers for the current block are nothing more than identical renditions of the current block itself, with different masks applied to distinguish their content.

In some examples, the use of masks allows the encoder to ignore pixels irrelevant to a particular layer when compressing that layer. In further examples, the encoder changes pixels in the masked-off areas of a layer, which are mostly irrelevant to reconstruction, to be consistent with pixels in unmasked areas, thus resulting in layers that can be compressed more efficiently.

Certain embodiments are directed to a method of encoding video signals. The method includes operating electronic encoding circuitry to express a portion of a video signal as a set of blocks, where each of the set of blocks includes a two-dimensional array of pixels of the video signal. The method further includes, for each current block of the set of blocks, (i) generating multiple layers, each layer including a two-dimensional array of pixels and providing a rendition of the current block, (ii) for each layer generated for the current block, generating an associated mask that identifies (a) one set of pixels that are to be used in reconstructing the current block and (b) another set of pixels that are not to be used in reconstructing the current block, and (iii) compressing each of the layers using a lossy compression procedure. The method still further includes providing the compressed layers and a set of the masks for each of the set of blocks to a video decoder for reconstructing the portion of the video signal.

Other embodiments are directed to an apparatus including electronic encoding circuitry. The apparatus is constructed and arranged to perform a method of encoding video signals, such as that described above. Still other embodiments are directed to a computer program product. The computer program product stores instructions, which when executed by electronic encoding circuitry cause the electronic encoding circuitry to perform the method of encoding video signals, such as described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings, FIG. 1 is a block diagram of an example environment in which embodiments of the improved technique hereof may be practiced;

FIG. 2 is a block diagram of an example computerized apparatus of the type shown in FIG. 1;

FIG. 3 is a block diagram of an example layering codec, which may be provided in the example computerized apparatus of the type shown in FIGS. 1 and 2;

FIGS. 9A and 9B are, respectively, an illustration of layers and masks used to encode a current block, where the layers are selected from inter-frame predictions of motion vectors for the current block, and a flowchart showing an example process for establishing settings of the mask for each layer;

FIGS. 12A-12D are a block diagram and associated flowcharts that show various example acts for performing DCT operations based on masks generated for respective layers.

DETAILED DESCRIPTION OF THE INVENTION

Figure 4:
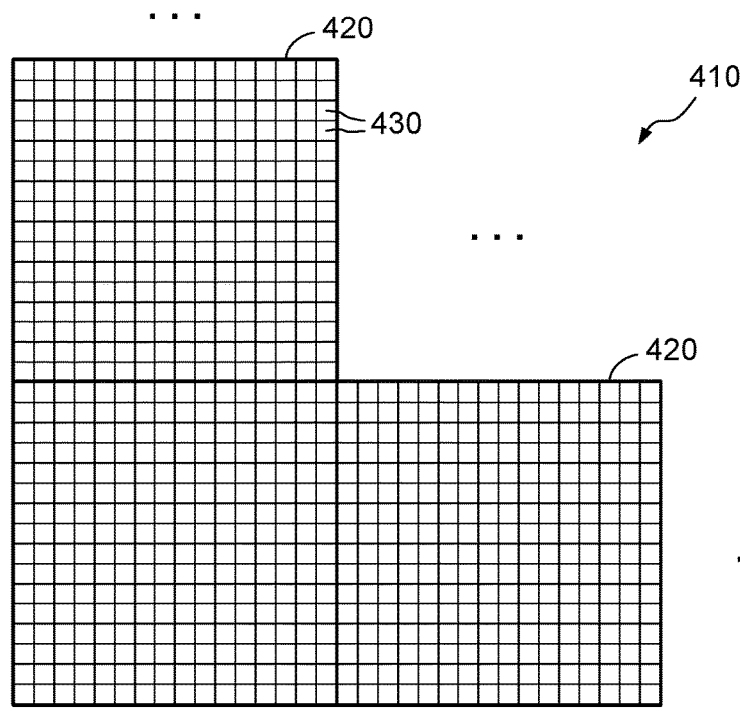
FIG. 4 is an illustration of example blocks and pixels of a portion of a video signal.

Embodiments of the invention will now be described. It is understood that such embodiments are provided by way of example to illustrate various features and principles of the invention, and that the invention hereof is broader than the specific example embodiments disclosed.

An improved technique for encoding video signals generates multiple layers and multiple corresponding masks for each of a set of blocks of a video signal. Each of the layers for a given block is a rendition of that block, and each of the masks distinguishes pixels of the respective layer that are relevant in reconstructing the block from pixels that are not. The encoder applies lossy compression to each of the layers and transmits the lossily compressed layers and a set of the masks to a decoder, such that the decoder may reconstruct the respective block from the layers and the mask(s).

FIG. 1 shows an example environment 100 in which embodiments of the improved technique hereof can be practiced. Here, multiple client machines, shown as machines 110(1) through 110(N), connect to a network 120. In some examples, a web conferencing server 130 also connects to the network 120. Each of the machines 110(1) through 110(N) is configured with a layering codec 250. The layering codec 250 is capable of encoding video signals by representing blocks in the form of layers and masks. The layering codec 250 is also capable of decoding video signals.

In example operation, the machines 110(1) through 110(N) each have installed thereon a web conferencing application. Users of machines 110(1) through 110(N) may each run the web conferencing application on their respective machines to participate in a web conference, which may be orchestrated by the web conferencing server 130. As the web conference proceeds, users of the machines 110(1) through 110(N) can communicate using audio signals and may share live video of themselves and of their surroundings. By invoking features of the web conferencing application, users may also share their desktops or particular applications or documents, such that all conference participants may view the same screen content at the same time. Screen sharing can serve numerous useful purposes, such as to allow users to make presentations, to work collaboratively, or simply to share information.

Each of the machines 110(1) through 110(N) may employ its respective layering codec 250 to compress and/or decompress video content, including screen content. For example, a codec running on any of the machines 110(1) through 110(N) obtains a video signal from a local camera (e.g., a webcam) and/or from locally originated screen content and encodes the obtained video signal. The originating machine transmits the encoded video signal, e.g., point-to-point or via the conferencing server 130, to receiving machines. Each receiving machine applies its respective codec to decode the video signal for viewing on a respective display.

By employing the layering codec 250, machines 110(1) to 110(N) can compress video data, and screen data in particular, more efficiently in real time than may be possible using conventional codecs. Also, production of noisy pixels around text or other high-contrast features can often be reduced or eliminated.

It should be understood that the machines 110(1) through 110(N) can be provided in any number and in any suitable form or forms, such as using any of desktop computers, laptop computers, smartphones, tablets, PDAs (personal data assistants), televisions, set-top boxes, and so forth, which are capable of operating the layering codec using software instructions executed by a set of processors and/or by using a specialized device or set of devices. Different ones of the machines 110(1) through 110(N) may be provided as different types of machines. In addition, the machines 110(1) through 110(N), or any of them individually, may interface with external or otherwise separate layering codecs. The layering codecs 250 may be implemented, for example, as self-contained devices, as separate modules, as integrated circuits, or as combinations of any of the above. Thus, the layering codec 250 may be implemented using any electronic circuitry, whether computerized or not.

The network 120 may be implemented using any type of network capable of conveying video data, such as a computer network (WAN, LAN, the Internet, etc.), a cable television network, a satellite network, a cell phone network, an over-the-air broadcast network, or any type of network or combination of networks.

Also, although the layering codec 250 is presented in connection with a web conferencing application, it should be understood that the use of the web conferencing application is merely illustrative. Rather, the layering codec 250 may be used in any situation that requires video compression and/or decompression.

FIG. 2 shows and example implementation of a computerized apparatus 110, and is intended to be typical of the machines 110(1) to 110(N). As indicated above, however, different ones of the machines 110(1) to 110(N) may be implemented differently. Thus, the example shown in FIG. 2 is merely illustrative.

Here, the computerized apparatus 110 is seen to include a camera 210, such as a built-in webcam or other camera, and a display 212, such as a computer monitor, screen, touchscreen, projector, television, etc. The computerized apparatus 110 is also seen to include a set of processors 220 (i.e., one or more processing chips and/or assemblies), a network interface 222, and memory 230. The memory 230 includes both volatile memory (e.g., RAM) and non-volatile memory, such as one or more disk drives, solid state drives, and the like. The set of processors 220 and the memory 230 together form control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations specified by the software constructs. Although certain software constructs are specifically shown and described, it is understood that the memory 230 typically includes many other software constructs, which are not shown, such as an operating system and various applications, processes, daemons, and so forth.

The memory 230 is seen to include instructions for realizing the above-described layering codec (250) and the web conferencing application (260). As shown, the layering codec 250 receives input from the camera 210, e.g., in a raw video format, and compresses the input for transmission to other machines 110 via the network interface 222. The layering codec 250 also receives compressed video signals via the network interface from other machines 110 and decompresses the received video signals. The computerized apparatus 110 may output the decompressed video signals to the display 212, e.g., for presentation to a user.

In some examples, the web conferencing application 260 operates in coordination with the layering codec 250 to send and receive video signals. The video signals may include live camera video as well as screen content of any displayed applications, windows, or desktops.

FIG. 3 shows an example implementation of the layering codec 250 in additional detail. Here, it is seen that the layering codec 250 includes an encoder 310, for compressing video signals, e.g., from the camera 210, from screen content, and/or from other sources, and a decoder 312, for decompressing video signals arriving from other machines or other compressed video sources. The layering codec 250 is also seen to include a decoder 312a. The decoder 312a is similar or identical to the decoder 312. The decoder 312a provides a replica of what a remote decoder would generate when decompressing video compressed by the encoder 310. In some examples, the encoder 310 receives output from the decoder 312a and applies the output to make inter-frame predictions and/or to adjust the manner in which the encoder 310 performs compression based on feedback from the decoder 312a. Just as the layering codec 250 may be implemented using electronic circuitry of any kind, whether computerized or not, so too may the encoder 310 and decoder 312/312a each be implemented separately or together using electronic encoding circuitry and electronic decoding circuitry, respectively, whether computerized or not. Thus, the provision of the encoder 310 and decoders 312 and 312a within the computerized apparatus 110 should be regarded as merely illustrative.

In the example shown, the encoder 310 provides two outputs, a first output that carries entropy encoded video data, e.g., for transmission over the network 120, and a second output that carries video data without entropy encoding, for provision to the decoder 312a. In such examples, the decoder 312 includes entropy decoding circuitry for decoding entropy-encoded input signals, whereas the decoder 312a does not.

FIG. 4 shows an example portion 410 of a video signal, which the encoder 310 may receive as input and/or which either of the decoders 312 or 312a may provide as output. The portion 410 of the video signal is seen to include multiple blocks 420 (three blocks 420 are shown). Each block 420 is a square array of pixels 430. For example, each of the blocks 420 is a 2-dimensional, 16×16 array of pixels 430. This is merely an example, however, as other block sizes may be used, such as 4×4, 8×8, 32×32, and so forth. In an example, the portion 410 of the video signal is part of a frame of video that includes many blocks 420 arranged in a rectangular array.

The pixels 430 themselves may be provided in a variety of formats. For example, the pixels 430 may be provided as binary pixels (e.g., black and white), as grayscale pixels, as monochrome color pixels, as composite color pixels, as pixels having luma and chroma values, as pixels having different color channels, or as pixels of other formats. The encoder 310 may receive such pixels, and the decoders 312 and 312a may output such pixels, in any of these formats, or in other formats, with minor and readily-discernable adjustments according to the particular pixel format used.

Figure 5:
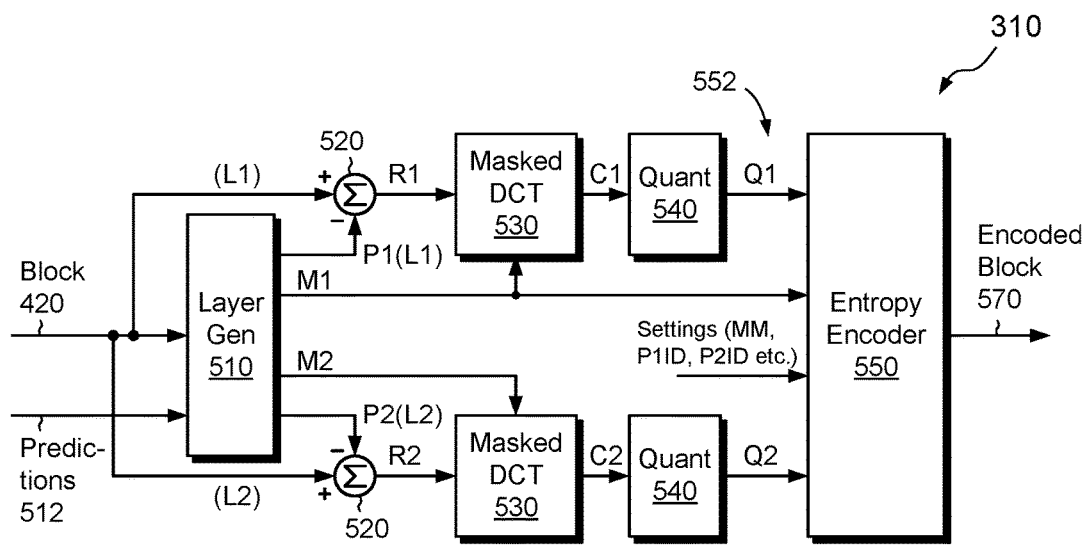
FIG. 5 is a block diagram of an example video encoder, which may be used in the layering codec of FIG. 3.

FIG. 5 shows an example encoder 310 in additional detail. Unlike encoders in conventional codecs, the encoder 310 generates multiple layers that are each amenable to high compression ratios while reducing or eliminating noise around high-contrast edges. Although the encoder 310 can operate by producing any number of layers, the example of FIG. 5 assumes for simplicity that the encoder 310 generates two layers.

The encoder 310 is seen to include a layer generator 510 and an entropy encoder 550, as well as two each of a summer 520, a masked DCT operator 530, and a quantizer 540. An additional summer 520, masked DCT operator 530, and quantizer 540 may be provided for each additional layer, if greater than two layers are desired.

In operation, the layer generator 510 receives a current block 420, as well as predictions 512. The predictions 512 may include any number of different predictions of the current block 420, including, for example, intra-frame predictions and/or inter-frame predictions. In an example, the encoder 310 generates the predictions 512, e.g., based on previously encoded blocks 420 and/or based on input from the decoder 312a.

In response to receiving the block 420 and the predictions 512, the layer generator 510 outputs a group of the predictions 512, e.g., P1 and P2, as well as a pair of masks, e.g., M1 and M2. In some examples, as will be described infra, the predictions P1 and P2 themselves provide the layers L1 and L2. In other examples, the current block 420 provides the layers L1 and L2. The layer generator 510 generates the mask M1 for layer L1 and generates the mask M2 for layer L2.

The summers 520 each subtract, pixel-for-pixel, a respective prediction, P1 or P2, from the current block 420, to generate a respective residual block, e.g., R1 or R2. The summers 520 each perform their respective subtractions in a pixel-wise manner, such that the value at each pixel location in the residual block, R1 or R2, is the difference between the pixel value at the same location in the block 420 and the pixel value at the same location in the prediction, P1 or P2.

Each masked DCT operator 530 then performs a DCT (Discrete Cosine Transform) on the respective residual block, R1 or R2, to generate a respective set of DCT coefficients, C1 or C2. Significantly, each masked DCT operator 530 receives a respective mask, M1 or M2, as input and generates the DCT coefficients, C1 or C2, based on both the respective residual block, R1 or R2, and the mask, M1 or M2.

Each quantizer 540 then performs rounding and/or truncation on C1 and C2, respectively, to produce quantized outputs Q1 and Q2. Each quantizer 540 reduces the granularity of its respective input, C1 or C2, and thus introduces losses, preferably in a manner that minimizes impact on the subjective viewing experience of the user.

The entropy encoder 570 then applies lossless compression, such as Huffman encoding, arithmetic encoding, or the like, to the quantized outputs, Q1 and Q2, to generate an encoded block 570, which is thus a compressed version of the current block 420. The entropy encoder 570 also preferably receives and encodes the mask M1 (and optionally M2), as well as various settings, which are also reflected in the encoded block 570. The settings include an identifier of each of the predictions P1 and P2 (i.e., P1ID and P2ID), used to generate the residual blocks R1 and R2, as well as a merge mode (MM). As will become apparent, providing identifiers P1ID and P2ID in the encoded block 570 allows a decoder 312 to replicate the predictions P1 and P2 to regenerate the layers L1 and L2. The merge mode (MM) specifies the manner in which the decoder 312 should reconstruct the block 420 using the layers L1 and L2, e.g., whether pixels in one layer should replace those in another layer or be blended therewith.

In an example, the masks M1 and M2 are binary masks, which each provide a 1-bit value for a respective layer (L1 or L2) at each pixel location in the current block 420. The 1-bit value for a pixel indicates whether the decoder 312 should use that pixel in the respective layer (L1 or L2) in reconstructing the current block 420. For example, a mask value of "1" for a given pixel location and layer means that the decoder 312 should use the pixel value for that pixel location and layer in reconstructing the current block. Conversely, a mask value of "0" means that the decoder 312 should not use the pixel for reconstructing the current block 420. As will be described infra, the encoder 310 can exploit areas of no interest as identified by the masks M1 and M2 to reduce the number of non-zero DCT coefficients that the masked DCT operators 530 produce, and/or to otherwise simplify DCT coefficients, and thus to further improve compression ratios.

It is generally not necessary for the encoder 310 to encode both masks M1 and M2. Rather, in some examples, the layer generator 510 produces masks that are mutually exclusive of one another, such that it is possible to send one fewer mask for a current block 420 than there are layers. If the layer generator 510 generates only two layers, then only the first mask (e.g., M1) need be encoded, with the second mask (M2) being computable as the pixel-wise inverse of the first mask (M1). More generally, if the encoder 310 generates M different masks for M layers, then only M−1 masks are typically represented in the encoded block 570, with the last mask being computable directly as the pixel-wise logical-NOR of all of the M−1 masks provided in the encoded block 570.

In some examples, the encoder 310 losslessly compresses the mask M1 (or multiple masks, if there are greater than two layers), such that the decoder 312 can recover the masks with perfect fidelity. Lossless compression of masks prevents noise from appearing in reconstructed images at mask boundaries. Because each mask preferably has only 1 bit per pixel, lossless encoding of masks adds only minimally to the overall cost of compression and has a small effect on overall compression ratio. Also, many masks tend to have large, continuous areas, where the masks are either all "0" or all "1." As lossless compression techniques can benefit from uniform regions to improve compression ratios, the internal structure of masks tends to make the contribution of masks to the overall cost of compression even less significant. Although lossless compression of masks tends to yield the best reconstruction, it should be understood that lossy compression of masks may be used in applications where noise at mask boundaries is found to be negligible or unimportant.

In some examples, the encoder 310 may use predictions for encoding the masks, as well. For example, the encoder 310 generates predictions of the masks and subtracts the predictions from respective complete masks (e.g., M1 or M2) to produce residual masks. The entropy encoder 550 encodes the residual masks, requiring less data to do so than would be required to encode the complete masks. In such situations, the encoder 310 may provide a prediction mode for each mask in the encoded block 570. When the decoder 312 receives the encoded block 570, the decoder 312 can access the prediction modes and replicate the mask predictions. The decoder 312 can then subtract the mask predictions from respective the residual masks to reconstruct the complete masks. Of course, if the encoder 310 uses only two masks, then only one residual mask will be needed, or, in general, one fewer residual mask will be needed than the number of layers.

Figure 6A:
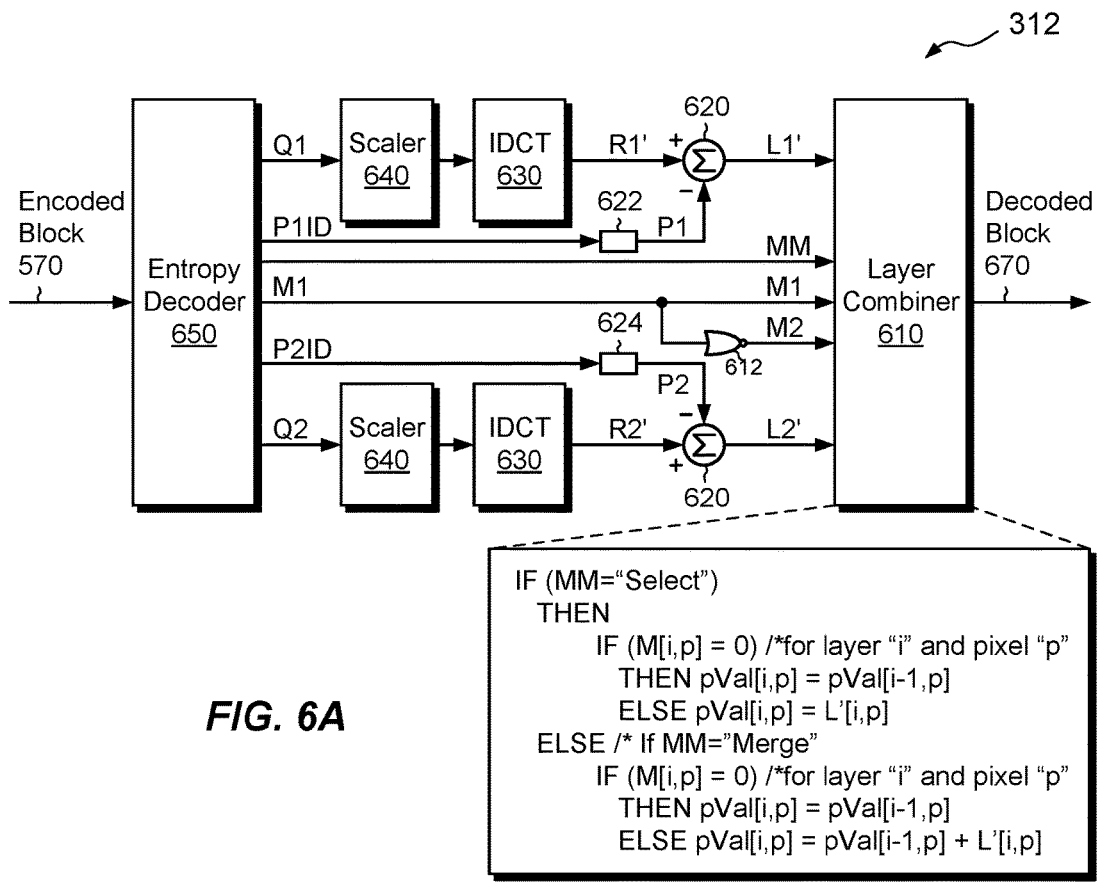
FIGS. 6A and 6B are block diagrams of example video decoders, which may be used in the layering codec of FIG. 3.
Figure 6B:
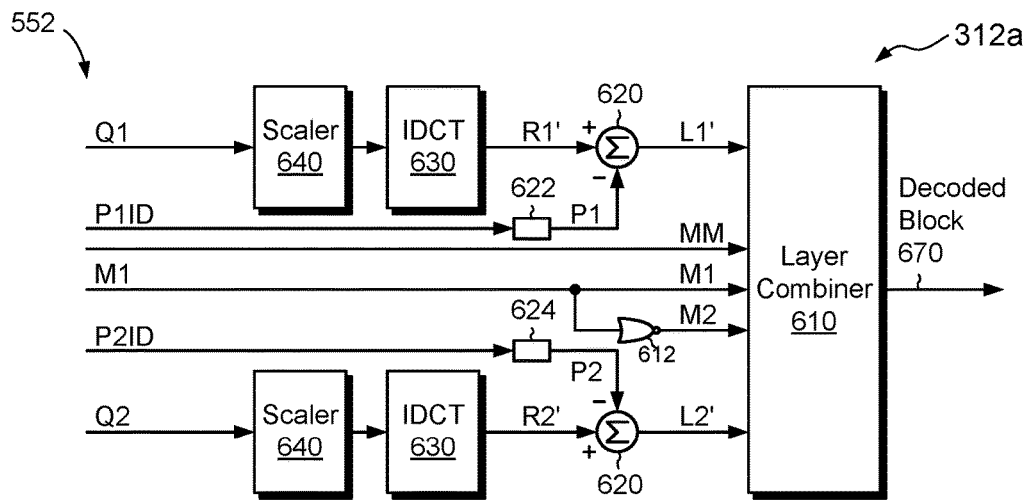

FIG. 6A shows an example implementation of the decoder 312 in additional detail. FIG. 6B also shows an example implementation of the decoder 312a that accompanies the encoder 310. The decoders 312 and 312a differ in that the decoder 312a does not require an entropy decoder, as the decoder 312a typically receives input signals that are not entropy encoded. The decoders 312 and 312a are otherwise similar or identical. It should be understood that, except for the details relating to entropy decoding, the operation described below for the decoder 312 applies equally to the decoder 312a.

Here, the decoder 312 essentially reverses the encoding process that was performed by the encoder 310. An entropy decoder 650 performs lossless decompression of the encoded block 570 (FIG. 5) to recover the quantized outputs Q1 and Q2, as well as to recover the identifiers P1ID and P2ID of predictions P1 and P2, the mask M1, and the merge mode, MM. Predictors 622 and 624 respectively generate the predictions P1 and P2 locally by referencing P1ID and P2ID. A pixel-wise NOR operator 612, or simply a pixel-wise inverter, regenerates M2 from M1. If greater than two layers are provided for the encoded block 570, then masks for each of those layers, except a last layer, may be input to the pixel-wise NOR operator 612, with the output of the pixel-wise NOR operator 612 providing the last mask.

Scalers 640 undo any scaling applied by quantizers 540, and IDCT operators 630 perform inverse-DCT operations to reconstruct residual blocks R1' and R2', which correspond to R1 and R2 in FIG. 5. Summers 620 then perform pixel-wise subtractions of predictions P1 and P2 from respective residual blocks R1' and R2', to generate reconstructed layers L1' and L2'. A layer combiner 610 receives the layers L1' and L2', the masks M1 and M2, and the merge mode MM, and generates therefrom a decoded block 670. The decoded block 670 is a decoded version of the encoded block 570 and represents a reconstruction of the original, current block 420 (FIG. 5). The decoder 312 may repeat these activities on multiple encoded blocks 570 to reconstruct the original portion 410 of the video signal (FIG. 4).

The layer combiner 610 combines layers L1' and L2' in a pixel-wise manner based on the specified merge mode MM to generate the decoded block 670. Reconstruction begins with the lowest layer (L1') and builds layer-upon-layer. In the example shown, layers and masks are described with subscripts [i,p], where "i" identifies a particular layer (here, L1' or L2') and "p" indicates a particular two-dimensional pixel location relative to the current block. As before, "M" refers to a mask and L' refers to a layer.

As indicated in the illustrated example, the merge mode MM may assume one of two values: "Select" or "Merge." In "Select" mode, the layer combiner 610 selects, on a pixel-by-pixel basis, whether a current pixel value "pVal" being prepared for the decoded block 670 should be set to the pixel value at the same pixel location in the previously processed layer (if there is one), or should be set to the value at that location in the current layer. The layer combiner 610 performs this selection based on the value of the mask for the currently processing layer. The operation for MM="Select" may be expressed with the following pseudocode:

```
IF (M[i,p] = 0)                    /*mask for layer "i" and pixel "p"
    THEN pVal[i,p] = pVal[i−1,p]   /*the value for the previous layer
    ELSE pVal[i,p] = L'[i,p]       /*the value for the current layer
```

In "Merge" mode, by contrast, the layer combiner 610 determines, on a pixel-by-pixel basis, whether the current pixel value "pVal" being prepared for the decoded block 670 should be set to the pixel value at the same pixel location in the previously processed layer (if there is one), or should be set to a combination of the previous pixel value and the value of the current layer. Again, the decision is based on the mask. The operation for MM="Merge" may be expressed as follows:

```
IF (M[i,p] = 0)                    /*mask for layer "i" and pixel "p"
    THEN pVal[i,p] = pVal[i−1,p]   /*the value for the previous layer
    ELSE pVal[i,p] =               /*a combination of the value
        pVal[i−1,p]+L'[i,p]             for the previous layer and the
                                        value for the current layer*/
```

Although the above-described merging operation is achieved by computing a simple sum of pVal[i−1,p]+L'[i,p], it is understood that weighted sums or other methods of blending pixel values may be used.

As there is no "previous layer" for the first layer (L1'), pVal[first,p] is simply L'[first,p] for all values of "p" (i.e., for all pixels of L1'). The process defined by the pseudocode above is then performed one layer at a time for all pixels in each successive layer, until all layers have been processed in order. Once all pixels of the last layer have been processed, the layer combiner 510 provides the values of pVal[last,p] to respective pixel locations in the decoded block 670.

It should be understood that the decoders 312 and 312a may differ on account of the different roles that they play. For example, the decoder 312a is generally collocated with the encoder 310 such that no entropy encoding and decoding is normally required. Thus, for example, the entropy decoder 650 may normally be omitted from the decoder 312a, which may receive non-entropy-encoded inputs 552 directly from the encoder 310 (see also inputs 552 provided as output from the encoder 310).

Figure 7A:
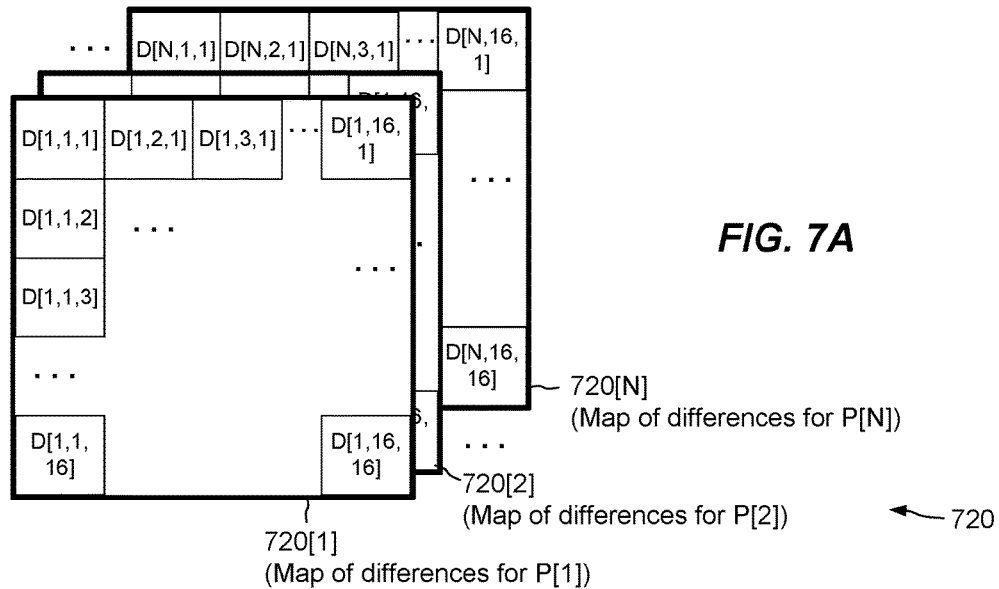
FIGS. 7A and 7B are, respectively, an illustration of multiple example maps of differences between predictions of the current block and the current block itself, and a flowchart showing an example process for selecting layers to represent the current block based on the predictions.
Figure 7B:
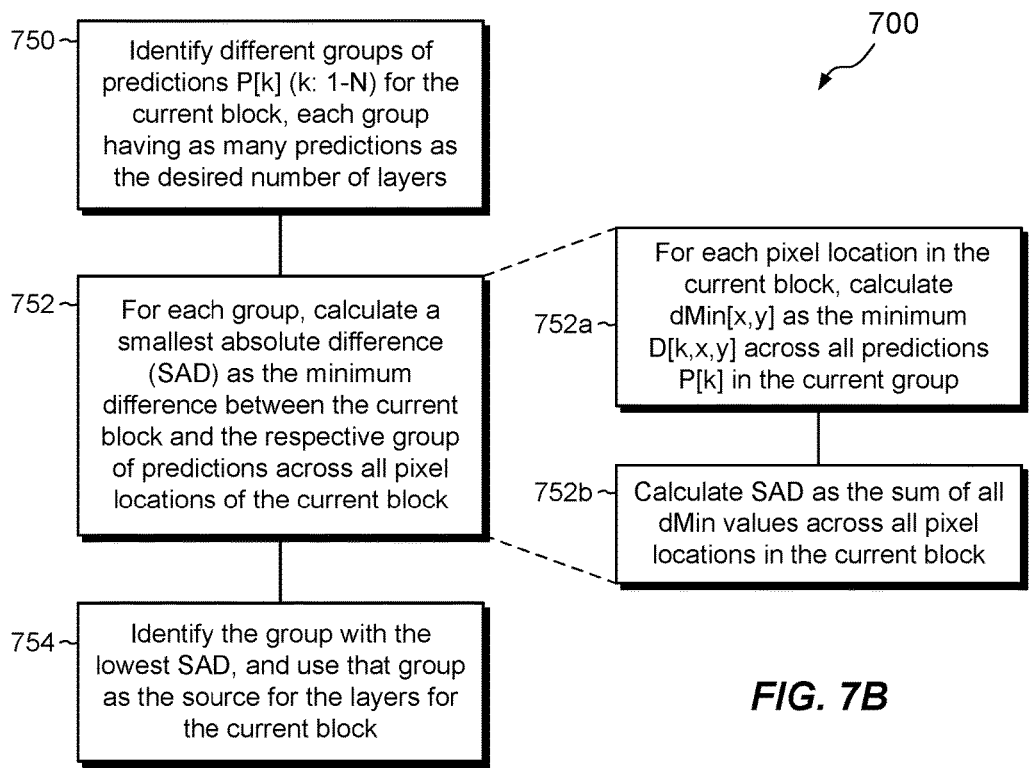

FIGS. 7A and 7B respectively show difference maps 720 and an example process 700 for generating layers to be used for encoding a current block 420. In an example, the process 700 is conducted by the layer generator 510 of the encoder 310 (FIG. 5). In general overview, the process 700 identifies a specific group of predictions from among the predictions 512, which the encoder 310 then applies as the layers for encoding the current block 420.

FIG. 7A shows an example illustration of difference maps 720. Each of the difference maps 720[k] (k:1–N) represents a pixel-wise difference between a current block 420 (FIG. 5) and a respective prediction P[k], i.e., one of the predictions 512 input to the layer generator 510 (FIG. 5). A total of "N" difference maps 720[1] to 720[N] are shown, one for each of N predictions. Each difference map 720 represents, for each pixel location in the current block 420, a respective difference value D[k,x,y], where "k" is a prediction index and "x" and "y" are column and row coordinates, respectively. If cb[x,y] is taken to be the current block 420, then each value of D[k,x,y] may be computed as follows:

$$D[k,x,y]=\text{ABS}(cb[x,y]-P[k,x,y]),$$

where, "ABS" indicates absolute value and "x" and "y" have been added as subscripts to P[k] to indicate pixel locations in the respective prediction.

Proceeding now to 750 in FIG. 7B, it is seen that the layer generator 510 of the encoder 310 identifies all possible unique combinations (groups) of predictions P[k] for the current block 420. Each group of predictions includes the same number of predictions as the desired number of layers that the encoder 310 will use when encoding the current block 420. For example, if the encoder 310 will use "numL" layers to encode the current block 420, then the layer generator 510 identifies all possible unique combinations of numL predictions each from among the "N" predictions. Using standard statistical methods, it can be seen that the layer generator 510 generates a total of N!/(N−numL)! groups of predictions. Thus, for example, if the encoder 310 uses two layers (numL=2) to encode the current block 420 and there are a total of ten predictions 512 to choose from (N=10), then the layer generator 510 generates 10!/8!=45 different groups, with each group including a unique combination of two predictions, P[k]. Of course, it is not always necessary to generate all possible unique groups of predictions all the time. Thus, identifying all possible groups should be regarded as merely illustrative.

At 752, the layer generator 510 calculates, for each group identified at 750, a smallest absolute difference (SAD). The layer generator 510 calculates the SAD for each group of predictions as the minimum difference between the current block 420 and the respective group of predictions across all pixel locations of the current block 420.

For example, and as indicated at 752a, the layer generator 510 calculates, for each pixel location [x,y] in the current block 420, a value "dMin" that equals the minimum D[k,x,y] (FIG. 7A) across all predictions P[k] that belong in the current group. If the current group consists of two predictions, identified by indices "i" and "j," then dMin can be expressed for each pixel location [x,y] as follows:

$$d\text{Min}[x,y]=\text{MIN}(D[i,x,y],D[j,x,y]),$$

where "MIN" is a function that computes the minimum of its operands. The above equation can easily be adapted to include greater than two predictions per group by including additional terms within the parenthesis.

At 752b, the layer generator 510 computes SAD for the current group as the sum of all dMin values across all pixel locations [x,y] in the current block 420. Continuing with the above example, $$SAD(i,j)=\Sigma d\text{Min}[x,y]$$

across all pixels locations [x,y] in the current block 420. The computation of SAD is then repeated for each unique group identified at 750.

At 754, the layer generator 510 identifies the group, from among the groups identified at 750, that has the lowest value of SAD. The group with the lowest SAD is thus the group that, overall, most closely predicts the current block 420. The layer generator 510 then uses the identified group with the lowest SAD as the source of layers for encoding the current block 420. For example, if the group with the lowest SAD includes two predictions, P[1] and P[2], then the layer generator 510 uses P[1] as the layer L[1] and P[2] as the layer L[2].

Thus, the process 700 generates layers by creating unique groups of predictions, finding the group that most closely approximates the current block 420, and using the predictions in that group to provide the layers that the encoder 310 uses to encode the current block 420.

Figure 8A:
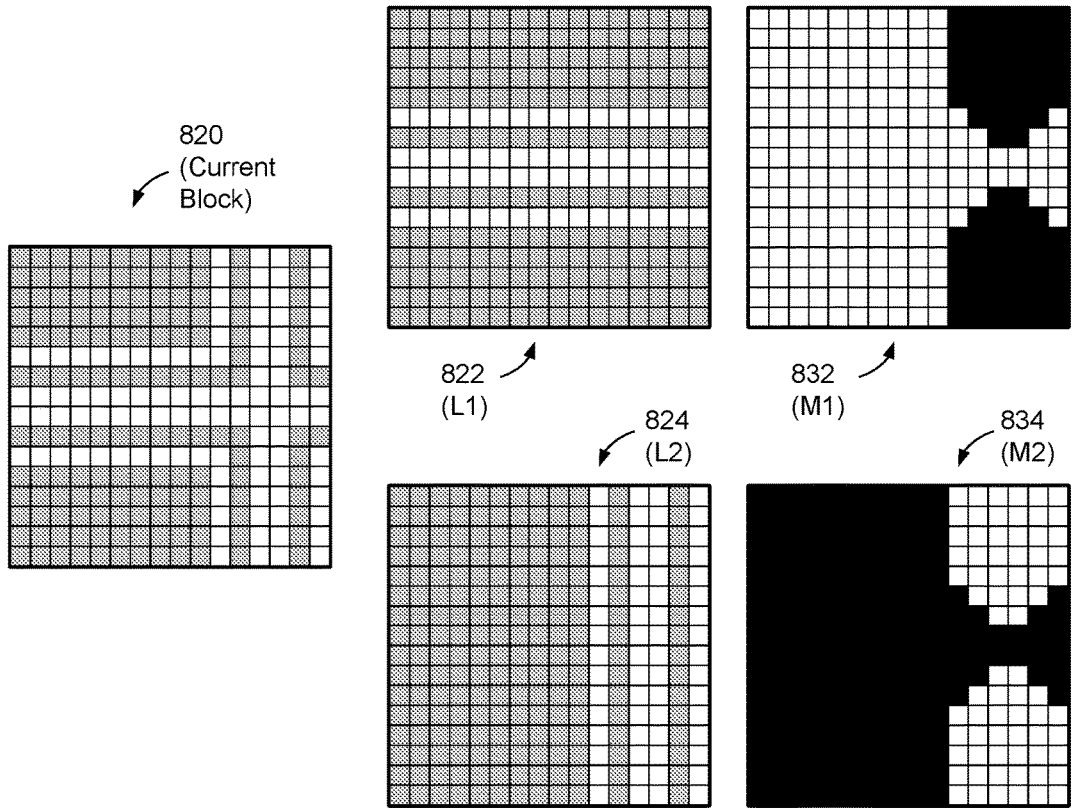
FIGS. 8A and 8B are, respectively, an illustration of layers and masks used to encode a current block, where the layers are selected from intra-frame predictions of the current block, and a flowchart showing an example process for establishing settings of the mask for each layer.
Figure 8B:
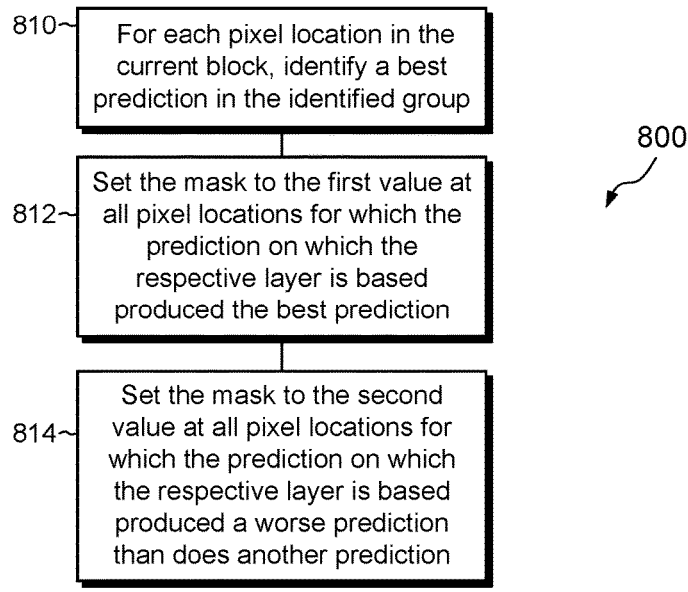

FIGS. 8A and 8B show an example whereby the layer generator 510 generates two layers L1 and L2 by prediction, e.g., using the process 700 above. Also, a process 800 (FIG. 8B) provides an example technique for establishing masks M1 and M2 corresponding to the layers L1 and L2, respectively.

At FIG. 8A, a current block 820 is provided as input to the encoder 310 and i includes lines that cross at right angles. For instance, the current block 820 may be a block from a video signal that includes a line drawing shared during a web conference (e.g., via screen sharing). To encode the block 820, the layer generator 510 may identify a group (e.g., the group with the lowest SAD in the process 700) consisting of two intra-frame predictions. A first intra-frame prediction 822 may be based on a previously-processed block immediately to the left of the current block 820, e.g., such that the prediction simply takes the right-most column of pixels in the previous block and extends them across the current block 820. Likewise, a second intra-frame prediction 824 may be based on a previously-processed block immediately above the current block 820, e.g., such that the prediction takes the bottom row of pixels in the block directly above the current block 820 and extends them down and through the current block 820. The layer generator 510 uses the predictions 822 and 824 as the layers L1 and L2, respectively, and generates respective masks 832 (M1) and 834 (M2). The mask 822 (M1) has a value of "1" (white) for each pixel location in the current block 820 for which L1 more closely approximates the value of the pixel than does L2. The mask 822 (M1) has a value of "0" (black) at pixel locations where another prediction produces a closer value. Likewise, the mask 824 (M2) has a value of "1" (white) for each pixel location in the current block 820 for which L2 more closely approximates the value of the pixel than does L1. The mask 824 (M2) has a value of "0" (black) at pixel locations where another prediction produces a closer value.

FIG. 8B shows an example process for setting the masks M1 and M2 in additional detail. At 810, the layer generator 510 identifies, for each pixel location, a best prediction in the identified group, with the identified group being the group that has the lowest SAD. For example, for pixel [1, 6] of the current block 820, the best prediction in the identified group, which includes predictions 822 and 824, is prediction 822, as prediction 822 more accurately represents pixel [1,6] than does prediction 824.

At 812, the layer generator 510 sets the mask to the first value (e.g., "1") at all pixel locations for which the prediction on which the respective layer is based produced the best prediction. Thus, for example, the layer generator 510 sets the mask 832 (M1) to "1" (white) at all pixel locations [x,y] at which prediction 822 does a better job of predicting the current block 820 than does prediction 824.

At 814, the layer generator 510 sets the mask to the second value (e.g., "0") at all pixel locations for which the prediction on which the respective layer is based produced a worse prediction than does another prediction. For example, the layer generator 510 sets the mask 832 (M1) to "0" (black) at all pixel locations [x,y] at which prediction 822 does a worse job of predicting the current block 820 than does prediction 824. The layer generator 510 can then compute second mask 834 (M2) as the pixel-wise inverse of the first mask 832 (M1).

It should be noted that, for some pixel locations, multiple predictions may produce the same "best predictions." In such cases, the layer generator 510 may set values in such masks in any suitable way. For example, the layer generator 510 may preferentially group together equal mask values in close spatial proximity to one another to facilitate subsequent entropy encoding. Thus, if it makes no difference in accuracy which mask has the "1" and which has (or have) the "0" at a given pixel location, the layer generator 510 may place the "1" on the mask that has other "1's" in the same vicinity.

FIGS. 9A and 9B show an example illustration and process 900 whereby the layer generator 510 generates two layers 922 (L1) and 924 (L2) based on inter-frame predictions of a current block 920. In an example, the layer generator 510 performs the process 900 for blocks found in P-frames of video signals, i.e., in frames that identify changes relative to other frames.

As shown in FIG. 9A, the current block 920 has a motion vector associated with each pixel location. Motion vectors are illustrated as arrows (or dots) in block 920. Each motion vector has a magnitude and a direction and points to a pixel in a preceding frame. Each motion vector reflects a prediction made by the encoder 310 that the pixel value in the current block 920 will be the same as the pixel value pointed-to by the motion vector. A dot appearing in a pixel location means that the motion vector points to the same pixel location in a previous frame. The particular example pattern of dots and arrows is highly suggestive of a foreground object moving relative to a stationary background object.

The layer generator 510 may exploit motion vectors that fall within different ranges to assign foreground and background content to different layers. In the example shown, the layer generator 510 uses the current block 920 as the source of both layers 922 (L1) and 924 (L2) and generates the masks 932 (M1) and 934 (M2) to distinguish between foreground and background content.

For example, the layer generator 510 may generate the mask 932 (M1) based on motion vectors to include foreground pixels and to exclude background pixels. Likewise, the layer generator 510 may generate the mask 934 (M2) based on motion vectors to include background pixels and to exclude foreground pixels. Although the example of FIG. 9A shows a static background layer, it should be understood that the background layer may alternatively be moving relative to the current block 920, such that both layers reflect moving content, albeit in different directions. Further, separation of differently-moving content into respective layers can be extended to greater than two layers, e.g., to reflect any number of objects moving at different speeds and/or in different directions.

FIG. 9B illustrates an example process 900 for separating objects into layers and respective masks based on motion vectors in greater detail. At 910, the layer generator 510 identifies a first set of pixels in the current block that each have an inter-frame motion vector that falls within a first range. For example, with reference back to FIG. 9A, the layer generator 510 identifies a first set of pixels as those with motion vectors that point up and to the left.

At 912, the layer generator 510 identifies a second set of pixels in the current block that each have an inter-frame motion vector that falls within a second range. For example, the layer generator 510 identifies a second set of pixels as those with motion vectors that each point to the same locations, or to nearly the same locations (e.g., as represented by dots).

At 914, the layer generator 510 sets the mask associated with the first layer to the first value at pixel locations of all of the first set of pixels and to the second value at pixel locations of all other pixels in the current block. For example, the layer generator 510 sets the mask 932 (M1) for layer 922 (L1) to "1" (white) at all pixel locations where the motion vectors point up and to the left and to "0" (black) elsewhere.

At 916, the layer generator 510 sets the mask associated with the second layer to the first value at pixel locations of all of the second set of pixels and to the second value at pixel locations of all other pixels in the current block. For example, the layer generator 510 sets the mask 934 (M2) for layer 924 (L2) to "1" (white) at all pixel locations where the motion vectors point nowhere (to the same pixel locations) and to "0" (black) elsewhere. Of course, if the encoder 310 uses only two layers, then the layer generator 510 can compute second mask 934 (M2) as simply the pixel-wise inverse of the first mask 932 (M1).

Figure 10A:
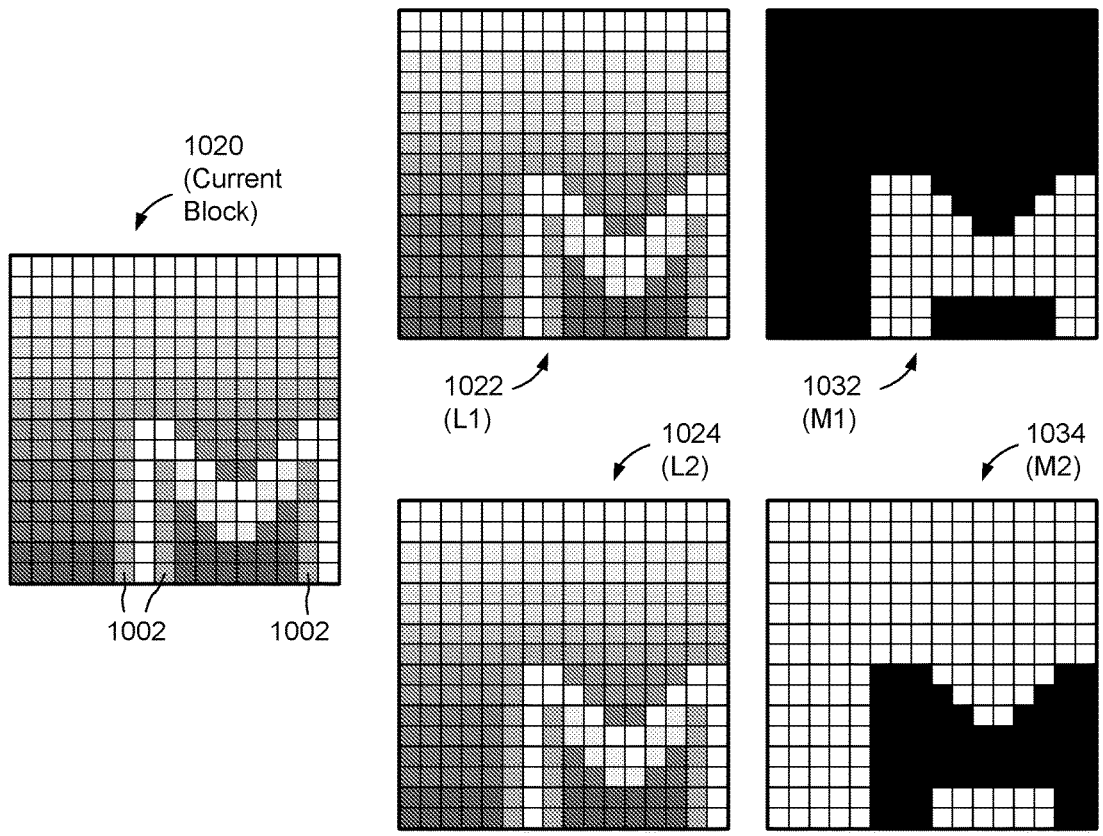
FIGS. 10A and 10B are, respectively, an illustration of layers and masks used to encode a current block, where the layers are selected by distinguishing foreground pixels from background pixels using edge detection, and a flowchart showing an example process for establishing settings of the mask for each layer.
Figure 10B:
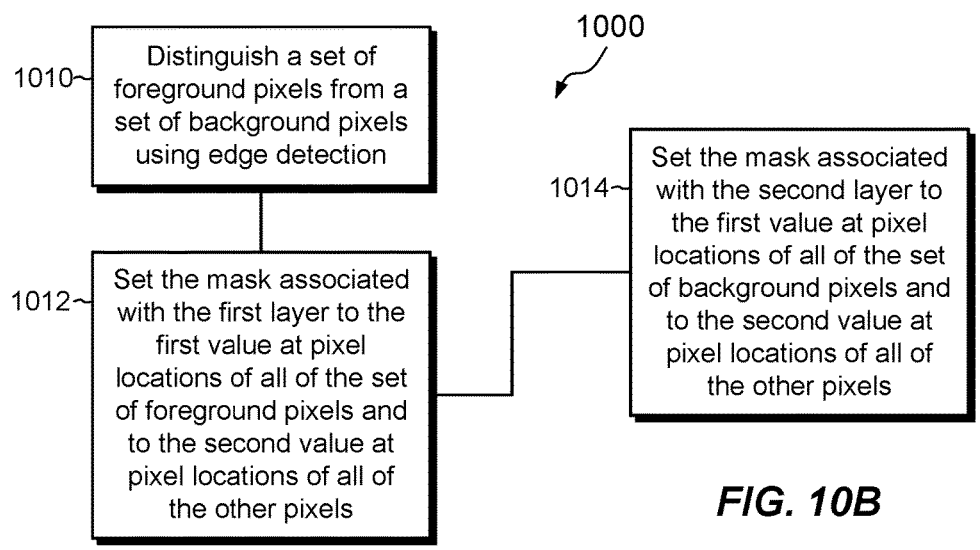

FIGS. 10A and 10B show an example illustration and process 1000 whereby the layer generator 510 generates two layers 1022 (L1) and 1024 (L2) by performing edge detection on a current block 1020. Here, it is seen that the current block 1020 includes pixels representing a letter "M" appearing over a background, which itself is a gradient having pixel values that gradually change. The letter "M" appears in the current block 1020 with anti-aliased pixels 1002. As is known, video signals may employ anti-aliased pixels around text characters and other sharp features to make their edges appear smooth, rather than jagged, when observed by the human eye.

Here, the layer generator 510 uses the current block 1020 as the source of layers 1022 (L1) and 1024 (L2). The layer generator 510 then generates masks 1032 (M1) and 1034 (M2) to distinguish the character (letter "M") from the gradient background. In this example, the layer generator 510 sets the mask 1032 (M1) to include not only the main pixels that form the character, but also the anti-aliased pixels 1002. Thus, the mask 1032 (M1) is slightly over-inclusive.

In an example, the layer generator 510 generates the mask 1032 (M1) using an edge-detection process, such as a Sobel filter, for categorizing pixels into edge pixels that represent an anti-aliased part of the character and non-edge pixels, and uses a histogram of pixel values of the non-edge pixels to distinguish pixels that represent the character from pixels that represent the background.

Although not clearly shown in FIG. 10A, the changing background gradient may be visible to the human eye within the illustrated character, i.e., the character may include both a background component and a foreground component. To preserve both components in reconstructed images, the encoder 310 may set the merge mode (MM, see FIG. 5) to "Merge," such that background pixels may be blended with foreground pixels when reconstructing the block 1020.

An example process 1000 of separation by edge detection is shown in FIG. 10B. At 1010, the layer generator 510 distinguishes a set of foreground pixels from a set of background pixels using edge detection. Sobel filtering or other edge-detection methods may be used.

At 1012, the layer generator 510 sets the mask associated with the first layer to the first value at pixel locations of all of the set of foreground pixels and to the second value at pixel locations of all of the other pixels. For example, the layer generator 510 sets the mask 1032 (M1) to "1" at all pixel locations within the detected object (including anti-aliased pixels 1002) and sets the mask to "0" elsewhere.

At 1014, the layer generator 510 sets the mask associated with the second layer to the first value at pixel locations of all of the set of background pixels and to the second value at pixel locations of all of the other pixels. For example, the layer generator 510 sets the mask 1034 (M2) to "1" at all pixel locations outside the detected object and sets the mask to "0" elsewhere. Of course, when the encoder 310 uses only two layers, then the layer generator 510 can compute the second mask 1034 (M2) as simply the pixel-wise inverse of the first mask 1032 (M1).

Figure 11A:
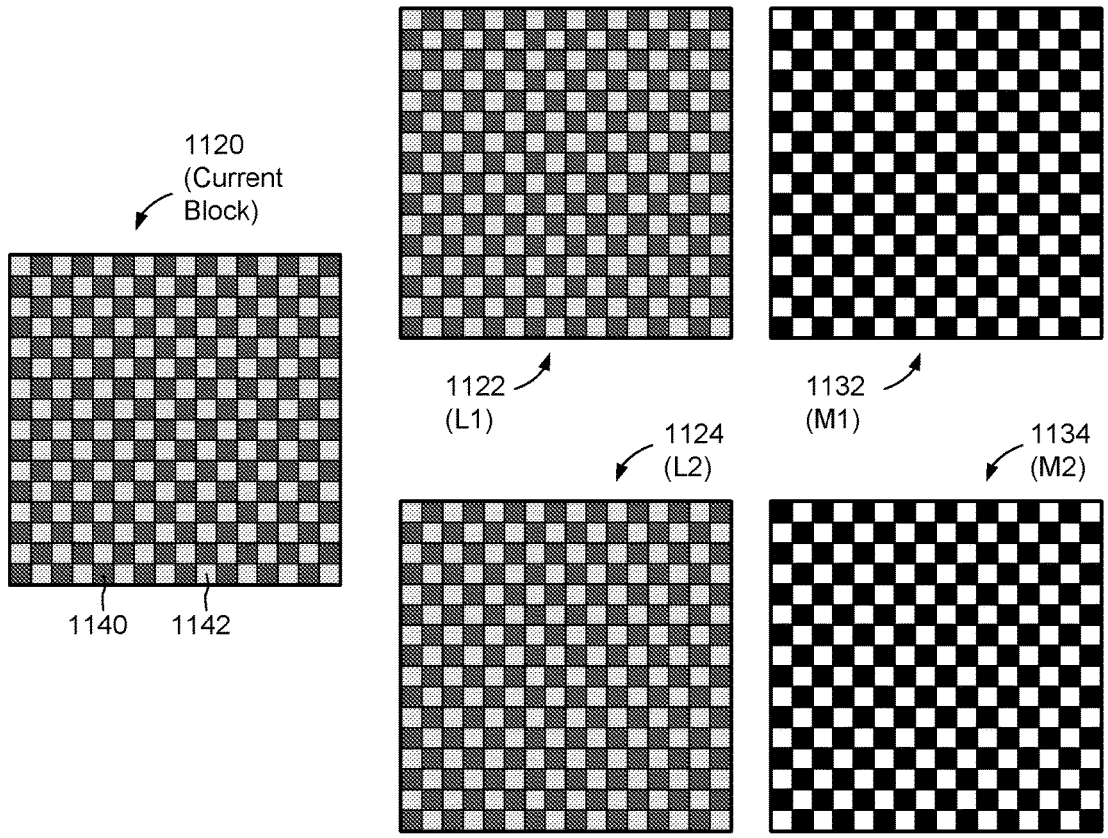
FIGS. 11A and 11B are, respectively, an illustration of layers and masks used to encode a current block, where the layers are selected based on colors of pixels in the current block, and a flowchart showing an example process for establishing settings of the mask for each layer.
Figure 11B:
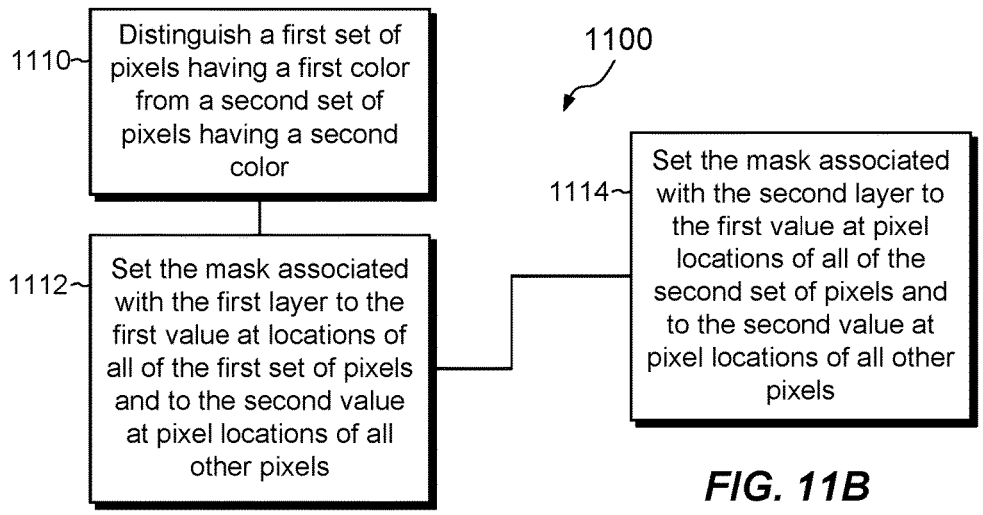

FIGS. 11A and 11B show an example illustration and process 1100 whereby the layer generator 510 generates two layers 1122 (L1) and 1124 (L2) by separating pixels of different colors in a current block 1120 into respective layers. Here, it is seen that the current block 1120 includes a checkerboard pattern of pixels of two different colors, e.g., a first color 1140 and a second color 1142. Once again, the layer generator 510 provides the current block (here, 1120) as the source for each of the layers, here, 1122 (L1) and 1124 (L2).

In this example, the layer generator 510 generates masks 1132 (M1) and 1134 (M2) such that each layer, once masked, includes pixels of only a single color. Of course, additional layers and masks can be provided for additional colors.

FIG. 11B shows an example process 1100 for separating pixels of the current block 1120 into layers and respective masks based on color. At 1110, the layer generator 510 distinguishes a first set of pixels having a first color from a second set of pixels having a second color. For example, the layer generator 510 distinguishes pixels having the color 1140 from pixels having the color 1142.

At 1112, the layer generator 510 sets the mask associated with the first layer to the first value at locations of all of the first set of pixels and to the second value at pixel locations of all other pixels. For example, the layer generator 510 sets the mask 1132 (M1) to "1" at all pixel locations where the pixel value is the first color 1140 and to "0" at all other pixel locations.

At 1114, the layer generator 510 sets the mask associated with the second layer to the first value at locations of all of the second set of pixels and to the second value at pixel locations of all other pixels. For example, the layer generator 510 sets the mask 1134 (M2) to "1" at all pixel locations where the pixel value is the second color 1142 and to "0" at all other pixel locations.

FIG. 12A shows an example block diagram of the masked DCT operators 530 (FIG. 5) in additional detail. FIGS. 12B-12D show example processes 1200B, 1200C, and 1200D performed by the masked DCT operators 530 in computing DCT coefficients from respective residual blocks (e.g., R1 and R2 of FIG. 5).

As shown in FIG. 12A, the masked DCT operator 530 receives as input a residual block R[k] (e.g., R1, R2, etc.) and a corresponding mask M[k] (e.g., M1, M2, etc.) for a particular layer (e.g., L1 or L2; FIG. 5) and generates as output a set of DCT coefficients C[k] (e.g., C1, C2, etc.) for that layer. The masked DCT operator 530 is seen to include a separator 1210, a pixel generator 1212, and a DCT generator 1214. The DCT generator 1214 may be of any suitable type, such as a conventional, radix-2 DCT function, an integer DCT function, or any type of DCT function known to those skilled in the art or yet to be developed.

In example operation, and as shown in FIG. 12B, the separator 1210 identifies masked pixels in the residual block R[k] (e.g., those at pixel locations where the mask value for the current layer is "0") and provides their pixel locations 1220 to the pixel generator 1212 (at 1230). The separator 1210 also provides values of unmasked pixels (e.g., those at pixel locations where the mask is "1") to the DCT generator 1214. The pixel generator 1212 receives the pixel locations 1220 of the masked pixels and proceeds to generate alternative pixel values 1224, which the pixel generator 1212 provides to the DCT generator 1214 (at 1232). The DCT generator 1214 then generates DCT coefficients C[k] using both the unmasked pixel values 1222 and the alternative pixel values 1224 (at 1234).

Because the decoder 312 (or 312a) does not directly use masked-off pixels in reconstructing a current layer, values of masked-off pixels are largely irrelevant as far as the current layer is concerned. Indeed, values of masked-off pixels in most cases matter only to the extent that they may cause compression of residual blocks R[k] to be more or less efficient and/or may introduce noise into adjacent, unmasked pixels in the reconstructed layer. A proper role of the pixel generator 1212 is thus to generate alternative pixel values 1224, which can be substituted in place of the values of the masked-off pixels, and which, when encoded by the DCT generator 1214 and quantizer 540 (FIG. 5), result in improved compression and/or image quality.

The pixel generator 1212 may employ various techniques for generating alternative pixel values 1224. In some examples, the pixel generator 1212 inspects the unmasked pixel values 1222 in the current block (and may inspect pixels in other blocks, e.g., in the same frame and/or in different frames), and computes the alternative pixel values 1224 to make them consistent with the unmasked pixel values 1222. For example, referring briefly back to FIG. 11A, the pixel generator 1212 can compute the alternative pixel values 1224 for each layer so that they are the same color as that of the unmasked pixels for the same layer. Thus, the pixel generator 1212 can set the alternative pixel values 1224 for layer 1122 (L1) to the color 1142, such that all pixels acted upon by the DCT generator 1214 for encoding layer 1122 (L1) have the same color (1142). DCT coefficients C[1] resulting from operation of the DCT generator 1214 are thus all zero except for a single "DC" term for the color 1142. Likewise, the pixel generator 1212 can set the alternative pixel values 1224 for the layer 1124 (L2) to the color 1140, such that all of the pixels acted upon by the DCT generator 1214 have the same color (1140). Resulting DCT coefficients C[2] are thus all zero except for a single DC term that indicates the color 1140.

It should be understood that the pixel generator 1212 can use any suitable method to make alternative pixel values 1224 that are consistent with unmasked pixels 1222. For example, the pixel generator 1212 may employ prediction techniques and/or interpolation techniques. Such techniques may act in the spatial domain and/or in the frequency domain, and may operate so as to maximize, or at least to improve, compressibility and/or image quality. In some examples, an objective of the pixel generator 1212 is to set the alternative pixel values 1224 so as to maximize the number of zero-valued DCT coefficients among the coefficients C[k]. Maximizing the number of zero-valued DCT coefficients is also consistent with improving image quality, as doing so simplifies spectral content and tends to reduce ringing and other noise artifacts around transitions between layers. Thus, for example, text appearing over a background (e.g., as shown in FIG. 10A) can appear crisp and sharp, or at least as sharp as the source material, when reproduced by the decoder 312 (or 312a). The decoder 312 can reconstruct anti-aliased pixels around high-contrast edges clearly and without obscuring the edges with noise. Whereas conventional encoding schemes require a tradeoff between compression ratio and image quality, here it is seen that both can be achieved, at least for certain image content, without having to sacrifice one for the other.

Although it has been described that the pixel generator 1212 may be operated to maximize the number of zero-valued DCT coefficients, this is merely an example. For instance, the pixel generator 1212 may be operated in any manner that simplifies subsequent entropy encoding, results in higher compression ratios, and/or improves image quality.

In some examples, the pixel generator 1212 generates alternative pixel values 1224 in a manner that is particularly well-suited for radix-2, DCT operations. In the example shown in FIG. 12C, it is assumed that the DCT generator 1214 employs a radix-2 topology, in which multiple DCT operations are performed in stages where each stage receives two inputs and generates two outputs. In the conventional manner (e.g., as specified in H.265), the DCT generator 1214 combines and cascades the stages, with results of certain stages provided as input to other stages so as to perform an overall, two-dimensional DCT. Here, the DCT generator 1214 performs this radix-2 DCT operation on the unmasked pixel values 1222 and the alternative pixel values 1224, with each pixel value applied in its respective location.

As shown at 1240 of FIG. 12C, when the pixel generator 1212 detects that both inputs to a radix-2 DCT operation are masked pixels, e.g., are pixels located at any of the masked-off pixel locations 1220, then (at 1242) zeros are provided for both outputs of the radix-2 DCT operation. For example, the pixel generator 1212, upon detecting that both inputs to a radix-2 DCT operation are masked pixels, sets the inputs of the radix-2 DCT operation to zero, regardless of the pixel values normally provided, so as to ensure that the DCT operation produces a pair of zeros at its output.

FIG. 12D covers the scenario where one input to a radix-2 DCT operation is a masked pixel and the other is an unmasked pixel. The pixel generator 1212 detects this occurrence at 1250, and in response, replaces the pixel value of the masked pixel with the pixel value of the unmasked pixel (1252), such that the radix-2 DCT operation acts upon the same pixel value for the masked pixel as for the unmasked pixel. When both inputs of a radix-2 DCT operation are unmasked pixels, the pixel generator 1212 may make no change to the inputs, and the radix-2 DCT operation may proceed in the customary manner.

The processes of FIGS. 12C and 12D thus provide an efficient means of setting masked pixels to the same values as corresponding unmasked pixels when performing radix-2 DCT operations. Such processes thus tend to force pixel values at masked pixel location to be the same as pixel values at unmasked pixel locations, thus promoting pixel consistency within a block.

Figure 13:
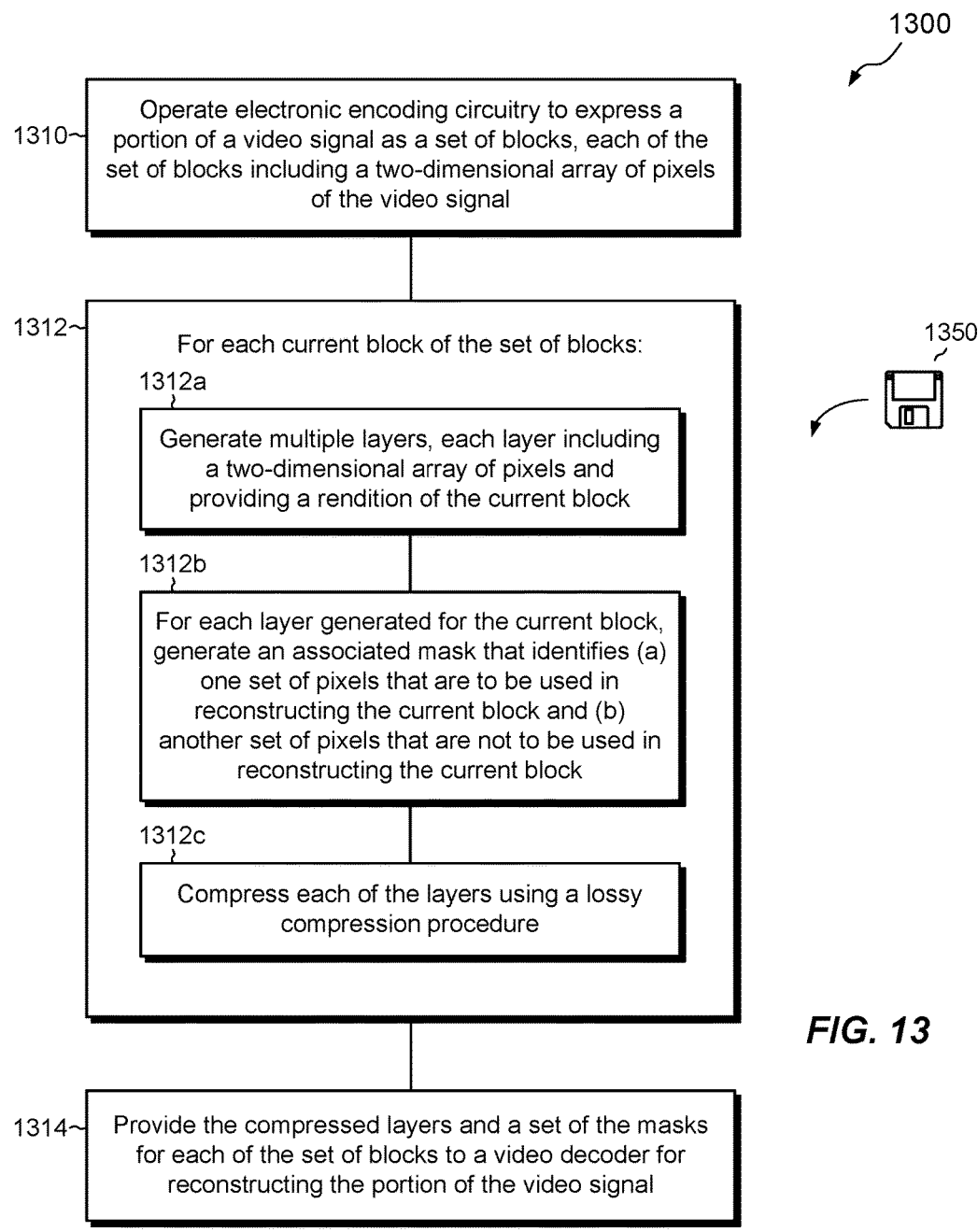
FIG. 13 is a flowchart showing an example process for encoding video signals.

FIG. 13 illustrates a process 1300 that may be carried out in connection with the computing environment 100 and provides a summary of some of the above-described techniques. The process 1300 is typically performed by the software constructs, described in connection with FIG. 2, which reside in the memory 230 of the computerized apparatus 110 and are run by the set of processors 220. The process 1300 may alternatively be performed by special-purpose circuitry, specialized chips and/or processors, and so forth. The various acts of the process 1300 may be ordered in any suitable way. Accordingly, embodiments may be constructed in which acts are performed in orders different from those illustrated, which may include performing some acts simultaneously, even though the acts are shown as sequential in the illustrated embodiments.

At 1310, electronic encoding circuitry is operated to express a portion of a video signal as a set of blocks. Each of the set of blocks includes a two-dimensional array of pixels of the video signal. For example, electronic circuitry, as realized by the layering codec 250 (FIG. 2) in the computerized apparatus 110, or in one or more chips, modules, specialized processors, and so on, is operated to express a portion of a video signal (e.g., portion 410; FIG. 4) as a set of blocks (e.g., blocks 420). Each of the blocks 420 includes a two-dimensional array of pixels 430 of the video signal.

At 1312, multiple acts are performed for each current block of the set of blocks (e.g., blocks 420). The multiple acts may be performed for different blocks sequentially, simultaneously (e.g., using parallel processing), or in any suitable order.

At 1312a, multiple layers are generated. Each layer includes a two-dimensional array of pixels and provides a rendition of the current block. For example, as shown in FIG. 5, the layer generator 510 generates multiple layers (L1 and L2), where each layer represents a rendition of the current block 420. In some examples, each rendition is a respective prediction of the current block (e.g., using intra-frame and/or inter-frame prediction; see FIGS. 8A, 8B, 9A, and 9B). In other examples, the encoder 310 provides the current block 420 itself as the respective layers (e.g., L1 and L2), such that the rendition of each layer is the same as the current block 420 itself. The layer generator 510 generates respective masks (e.g., M1 and M2) to distinguish between content of respective layers, such as by using edge detection and/or color detection (see FIGS. 10A, 10B, 11A, and 11B).

At 1312b, for each layer generated for the current block, an associated mask is generated that identifies (a) one set of pixels that are to be used in reconstructing the current block and (b) another set of pixels that are not to be used in reconstructing the current block. For example, the layer generator 510 generates masks M1 and M2, where each mask identifies a respective set of pixel locations to be used by the decoder 312 (or 312*a*) when reconstructing the current block 420. Example masks are also shown at FIGS. 8A, 9A, 10A, and 11A.

At 1312*c*, each of the layers is compressed using a lossy compression procedure. For example, each layer is compressed by computing a residual block (R1 or R2), performing a masked DCT (using operator 530), quantizing resulting DCT coefficients (by quantizer 540), and performing lossless compression on the results (by entropy encoder 550). The quantizer 540 applies rounding and/or truncation to DCT coefficients (e.g., C1 and C2), and thereby introduces losses while reducing the amount of compressed data to be transmitted or stored.

At 1314, the compressed layers and a set of the masks for each of the set of blocks are provided to a video decoder for reconstructing the portion of the video signal. For example, as described in connection with FIG. 5, the compressed residual blocks (e.g., R1 and R2), the prediction modes of the predictions (e.g., P1 and P2) used to generate the residual blocks, and one fewer mask than there are layers are provided to a decoder. The decoder may be a remote decoder 312, e.g., running on a different computerized apparatus or device, or it may be a local decoder 312*a* used in connection with the encoder 310.

An improved technique has been described for encoding a video signal. The technique includes generating multiple layers and multiple corresponding masks for each of a set of blocks of the video signal. Each of the layers for a given block is a rendition of that block, and each of the masks distinguishes pixels of the respective layer that are relevant in reconstructing the block from pixels that are not. The encoder applies lossy compression to each of the layers and transmits the lossily compressed layers and a set of the masks to a decoder, such that the decoder may reconstruct the respective block from the layers and the mask(s).

Having described certain embodiments, numerous alternative embodiments or variations can be made. For example, it has been shown that the layering codec 250 includes both the encoder 310 and the decoder 312. However, the encoder 310 and the decoder 312 may alternatively be provided separately, e.g., as separate software constructs or as separate physical devices, modules, etc.

Also, the masked DCT operator 530 has been shown and described only insofar as it is part of the encoder 310. This is merely an example, however, as alternative embodiments may provide the masked DCT operator 530 separately, e.g., for use with different encoders or in different applications.

Also, embodiments have been described in the context of a web conferencing application that supports screen sharing. This is merely an example, however, as the encoder 310 and/or decoder 312 may be used in connection with a wide range of software applications or independently of any software application. Other example use cases may include multicasting, webcasting, and/or broadcasting, for example.

Further, although embodiments have been described that employ predictions for generating residual blocks and in some cases layers and masks, it should be understood that the use of predictions is an optimization and should not be regarded as required unless expressly indicated.

Further still, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1350 in FIG. 13). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of encoding video signals, the method comprising:

operating electronic encoding circuitry to express a portion of a video signal as a set of blocks, each of the set of blocks including a two-dimensional array of pixels of the video signal;

for each current block of the set of blocks,
(i) generating multiple layers, each layer including a two-dimensional array of pixels and providing a rendition of the current block,
(ii) for each layer generated for the current block, generating an associated mask that identifies (a) one set of pixels that are to be used in reconstructing the current block and (b) another set of pixels that are not to be used in reconstructing the current block, and
(iii) compressing each of the layers using a lossy compression procedure, and providing the compressed layers and a set of the masks for each of the set of blocks to a video decoder for reconstructing the portion of the video signal, wherein compressing each of the layers for the current block includes (i) calculating a residual block for each layer generated for the current block, each residual block representing a difference between the current block and a prediction of the current block, and (ii) applying the lossy compression procedure to each residual block, wherein the mask generated for each layer is a pixel-wise, 1-bit mask that has a first value for each pixel of the respective layer to be used in reconstructing the current block and a second value for each pixel of the respective layer not to be used in reconstructing the current block, wherein, for each residual block, applying the lossy compression procedure to the residual block includes performing a DCT (Discrete Cosine Transform) operation on the residual block, wherein the DCT operation (i) receives, as input, the residual block and the mask for that residual block and (ii) generates, as output, a set of DCT coefficients that are based on both the residual block and the mask, wherein performing the DCT operation on each residual block includes performing multiple radix-2 butterfly operations, each radix-2 butterfly operation receiving a pair of inputs and generating a pair of outputs, wherein, for one of the radix-2 butterfly operations, the pair of inputs represents a pair of pixels of the residual block, and wherein, when generating the pair of outputs from the pair of pixels, the radix-2 butterfly operation performs the acts of:
  (i) detecting that both of the pair of pixels are masked pixels, and
  (ii) in response to detecting, providing zeros for both of the pair of outputs.

2. The method of claim 1, wherein providing the set of masks to the video decoder includes transmitting the set of masks to the video decoder in a losslessly compressed form.

3. The method of claim 2, wherein the set of masks includes N masks, wherein providing the set of masks to the video decoder includes, for each current block, transmitting N−1 masks, wherein an N-th mask that is not transmitted to the video decoder for the current block is computable from the masks that are transmitted to the video decoder.

4. The method of claim 3, wherein the mask that is not transmitted to the video decoder for the current block is computable by performing a pixel-wise logical NOR'ing operation on all of the masks that are transmitted to the video decoder.

5. The method of claim 1, wherein applying the lossy compression procedure to each residual block includes applying the mask for that residual block as input to the lossy compression procedure to generate a compressed residual block that is based on both the residual block and the mask.

6. The method of claim 1, wherein performing the DCT operation on each residual block includes:
  identifying a set of masked pixels, for which the mask has the second value; and
  substituting, in place of values of the set of masked pixels in the residual block, a set of alternative pixel values as inputs to the DCT operation,
  wherein computing the set of DCT coefficients is based in part on the set of alternative pixel values and results in DCT coefficients that are more compressible by entropy encoding than those that would be produced by performing the DCT operation based on the values of the set of masked pixels.

7. The method of claim 1,
wherein, for another of the radix-2 butterfly operations, the pair of inputs includes a first input representing a first pixel of the residual block and a second input representing a second pixel of the residual block, and
wherein, when computing the pair of outputs from the pair of inputs, the radix-2 butterfly operation performs the acts of:
  (i) detecting that the first pixel is an unmasked pixel and that the second pixel is a masked pixel; and
  (ii) in response to detecting, generating the pair of outputs using a value of the first pixel for both the first input and the second input.

8. The method of claim 2, wherein the method further comprises providing a merge mode to the video decoder for any of the set of blocks, the merge mode directing the video decoder to combine layers when reconstructing the respective block using one of (i) a selection process in which values of one layer replace values of another layer or (ii) a blending process in which values of multiple layers are combined.

9. The method of claim 1, wherein generating multiple layers of video data includes, for each current block:
  generating multiple predictions of the current block;
  identifying different groups of predictions from among the multiple predictions;
  for each group of predictions, calculating a smallest absolute difference (SAD), the SAD being a minimum difference between the current block and the respective group of predictions across all pixel locations of the current block;
  identifying the group for which the lowest SAD difference was calculated; and
  using the identified group as a source of the layers for the current block, such that each of the predictions in the identified group forms a respective one of the layers for the current block.

10. The method of claim 9, wherein generating multiple layers of video data further includes, for each of the predictions, calculating a map of pixel-wise differences between the current block and the respective prediction, and wherein calculating the SAD between the current block and the respective group includes:
  for each pixel in the current block, identifying the minimum of the pixel-wise differences across all maps of pixel-wise differences in the respective group; and
  summing the identified minimum pixel-wise differences across all pixel locations of the current block.

11. The method of claim 10, further comprising, for each pixel location of the current block, identifying a best prediction, the best prediction being the prediction that resulted in the minimum pixel-wise difference identified across all maps of pixel-wise differences in the identified group with the lowest SAD, wherein generating the mask associated with each layer of the current block includes:
  setting the mask to the first value at all pixel locations for which the prediction on which the respective layer is based produced the best prediction; and
  setting the mask to the second value at all pixel locations for which the prediction on which the respective layer is based produced a worse prediction than does another prediction.

12. The method of claim 9, wherein generating the multiple predictions includes generating both intra-frame predictions and inter-frame predictions.

13. The method of claim 1, wherein generating multiple layers of video data includes, for each current block, providing the current block as both a first layer and a second layer, and wherein generating the mask associated with each layer of the current block includes:
  identifying a first set of pixels in the current block that each have an inter-frame motion vector that falls within a first range;
  identifying a second set of pixels in the current block that each have an inter-frame motion vector that falls within a second range, the second range not overlapping with the first range;

setting the mask associated with the first layer to the first value at pixel locations of all of the first set of pixels and to the second value at pixel locations of all other pixels in the current block; and setting the mask associated with the second layer to the first value at pixel locations of all of the second set of pixels and to the second value at pixel locations of all other pixels in the current block.

14. The method of claim 13, wherein the first set of pixels represents a static overlay in a foreground of the current block and the second set of pixels represents moving video content in a background of the current block.

15. The method of claim 1, wherein generating multiple layers of video data includes, for each current block, providing the current block as both a first layer and a second layer, and wherein generating the mask associated with each layer of the current block includes:

distinguishing a set of foreground pixels from a set of background pixels using edge detection;

setting the mask associated with the first layer to the first value at pixel locations of all of the set of foreground pixels and to the second value at pixel locations of all of the other pixels; and setting the mask associated with the second layer to the first value at pixel locations of all of the set of background pixels and to the second value at pixel locations of all of the other pixels.

16. The method of claim 15, further comprising directing the video decoder to preserve anti-aliased content around detected edges by blending the first layer with the second layer in vicinities of the detected edges.

17. The method of claim 1, wherein generating multiple layers of video data includes, for each current block, providing the current block as both a first layer and a second layer, and wherein generating the mask associated with each layer of the current block includes:

distinguishing a first set of pixels having a first color from a second set of pixels having a second color;

setting the mask associated with the first layer to the first value at locations of all of the first set of pixels and to the second value at pixel locations of all other pixels; and setting the mask associated with the second layer to the first value at pixel locations of all of the second set of pixels and to the second value at pixel locations of all other pixels.

18. An apparatus for encoding video signals, the apparatus comprising electronic encoding circuitry constructed and arranged to:

express a portion of a video signal as a set of blocks, each of the set of blocks including a two-dimensional array of pixels of the video signal;

for each current block of the set of blocks,
(i) generate multiple layers, each layer including a two-dimensional array of pixels and providing a rendition of the current block,
(ii) for each layer generated for the current block, generate an associated mask that identifies (a) one set of pixels that are to be used in reconstructing the current block and (b) another set of pixels that are not to be used in reconstructing the current block, and
(iii) compress each of the layers using a lossy compression procedure, and provide the compressed layers and a set of the masks for each of the set of blocks to a video decoder for reconstructing the portion of the video signals, wherein the electronic encoding circuitry constructed and arranged to compress each of the layers for the current block is further constructed and arranged to (i) calculate a residual block for each layer generated for the current block, each residual block representing a difference between the current block and a prediction of the current block, and (ii) applying the lossy compression procedure to each residual block, wherein the mask generated for each layer is a pixel-wise, 1-bit mask that has a first value for each pixel of the respective layer to be used in reconstructing the current block and a second value for each pixel of the respective layer not to be used in reconstructing the current block, wherein, for each residual block, the electronic encoding circuitry constructed and arranged to apply the lossy compression procedure to the residual block is further constructed and arranged to perform a DCT (Discrete Cosine Transform) operation on the residual block, wherein the DCT operation is configured to (i) receive, as input, the residual block and the mask for that residual block and (ii) generate, as output, a set of DCT coefficients that are based on both the residual block and the mask, wherein the DCT operation is further configured to perform multiple radix-2 butterfly operations on each residual block, each radix-2 butterfly operation receiving a pair of inputs and generating a pair of outputs, wherein, for one of the radix-2 butterfly operations, the pair of inputs represents a pair of pixels of the residual block, and wherein, when configured to generate the pair of outputs from the pair of pixels, the radix-2 butterfly operation is further configured to:
(i) detect that both of the pair of pixels are masked pixels, and
(ii) in response to detecting, provide zeros for both of the pair of outputs.

19. A non-transitory, computer-readable medium including instructions which, when executed by electronic encoding circuitry, cause the electronic encoding circuitry to perform a method for encoding video signals, the method comprising:

operating electronic encoding circuitry to express a portion of a video signal as a set of blocks, each of the set of blocks including a two-dimensional array of pixels of the video signal;

for each current block of the set of blocks,
(i) generating multiple layers, each layer including a two-dimensional array of pixels and providing a rendition of the current block,
(ii) for each layer generated for the current block, generating an associated mask that identifies (a) one set of pixels that are to be used in reconstructing the current block and (b) another set of pixels that are not to be used in reconstructing the current block, and
(iii) compressing each of the layers using a lossy compression procedure, and providing the compressed layers and a set of the masks for each of the set of blocks to a video decoder for reconstructing the portion of the video signal, wherein compressing each of the layers for the current block includes (i) calculating a residual block for each layer generated for the current block, each residual block representing a difference between the current block and a prediction of the current block, and (ii) applying the lossy compression procedure to each residual block, wherein the mask generated for each layer is a pixel-wise, 1-bit mask that has a first value for each pixel of the respective layer to be used in reconstructing the current block and a second value for each pixel of the respective layer not to be used in reconstructing the current block, wherein, for each residual block, applying the lossy compression procedure to the residual block includes performing a DCT (Discrete Cosine Transform) operation on the residual block, wherein the DCT operation (i) receives, as input, the residual block and the mask for that residual block and (ii) generates, as output, a set of DCT coefficients that are based on both the residual block and the mask, wherein performing the DCT operation on each residual block includes performing multiple radix-2 butterfly operations, each radix-2 butterfly operation receiving a pair of inputs and generating a pair of outputs, wherein, for one of the radix-2 butterfly operations, the pair of inputs represents a pair of pixels of the residual block, and wherein, when generating the pair of outputs from the pair of pixels, the radix-2 butterfly operation performs the acts of:
  (i) detecting that both of the pair of pixels are masked pixels, and
  (ii) in response to detecting, providing zeros for both of the pair of outputs.

* * * * *